US012759431B2

(12) United States Patent
Scheuerell et al.

(10) Patent No.: US 12,759,431 B2
(45) Date of Patent: Oct. 13, 2026

(54) HIERARCHICAL POWER CONTROL

(71) Applicant: Cummins Power Generation Inc, Minneapolis, MN (US)

(72) Inventors: Michael James Scheuerell, Stillwater, MN (US); Akshat Abhay Raut, Indianapolis, IN (US); Jonathan W. Georgas, Charleston, SC (US)

(73) Assignee: Cummins Power Generation Inc., Minneapolis, MN (US)

(*) Notice: Subject to any disclaimer, the term of this patent is extended or adjusted under 35 U.S.C. 154(b) by 28 days.

(21) Appl. No.: 18/949,617

(22) Filed: Nov. 15, 2024

(65) Prior Publication Data

US 2025/0162467 A1 May 22, 2025

Related U.S. Application Data

(60) Provisional application No. 63/601,665, filed on Nov. 21, 2023.

(51) Int. Cl.
*B60L 58/40* (2019.01)
*B60L 58/10* (2019.01)
(Continued)

(52) U.S. Cl.
CPC ............... *B60L 58/40* (2019.02); *B60L 58/10* (2019.02); *B60L 58/32* (2019.02);
(Continued)

(58) Field of Classification Search
CPC .......... B60L 58/40; B60L 58/10; B60L 58/32; H01M 8/04701; H01M 8/0494;
(Continued)

(56) References Cited

U.S. PATENT DOCUMENTS 8,016,061 B2 9/2011 Jeon et al.
8,897,943 B2 11/2014 Sheidler et al.
(Continued)

FOREIGN PATENT DOCUMENTS

CN 115139864 A 10/2022
EP 3 957 515 A2 2/2022

OTHER PUBLICATIONS

Examination Report in AU Application No. 2024266735, dated Sep. 12, 2025, 4 pgs.

*Primary Examiner* — Luis A Martinez Borrero
(74) *Attorney, Agent, or Firm* — Foley & Lardner LLP

(57) ABSTRACT

Presented herein are systems for vehicle power control. The system includes a first controller arranged in a first hierarchical layer of a control topology, the first controller configured to control a first source of energy of a vehicle based on first data of the first source of energy, a second controller arranged in the first hierarchical layer of the control topology, the second controller configured to control a second source of energy of the vehicle based on second data of the second source of energy, and a third controller configured to receive the first data and the second data from the first hierarchical layer, generate a control signal based on the first data and the second data, and transmit the control signal to a component of the vehicle to control the component of the vehicle.

19 Claims, 11 Drawing Sheets

(51) Int. Cl.

| | |
|---|---|
| ***B60L 58/32*** | (2019.01) |
| ***H01M 8/04701*** | (2016.01) |
| ***H01M 8/04858*** | (2016.01) |
| ***H01M 10/42*** | (2006.01) |
| ***H01M 16/00*** | (2006.01) |

(52) U.S. Cl.
CPC ..... *H01M 8/04701* (2013.01); *H01M 8/0494* (2013.01); *H01M 10/425* (2013.01); *H01M 16/006* (2013.01); *H01M 2220/20* (2013.01); *H01M 2250/20* (2013.01)

(58) Field of Classification Search
CPC ............. H01M 10/425; H01M 16/006; H01M 2220/20; H01M 2250/20
USPC .............................................................. 701/22
See application file for complete search history.

(56) References Cited

U.S. PATENT DOCUMENTS

| | | | | |
|---|---|---|---|---|
| 9,254,838 | B2 | 2/2016 | Whitney et al. | |
| 9,389,145 | B2 | 7/2016 | Andreae | |
| 10,077,040 | B2 | 9/2018 | Chen et al. | |
| 10,328,820 | B2 * | 6/2019 | Cai | H01M 8/04753 |
| 10,981,557 | B2 | 4/2021 | Ye et al. | |
| 11,235,748 | B2 | 2/2022 | Rich et al. | |
| 11,660,981 | B2 * | 5/2023 | Ichikawa | B60K 35/28 701/22 |
| 12,049,151 | B2 * | 7/2024 | Wang | B60L 53/53 |
| 12,280,679 | B2 * | 4/2025 | Koti | H01M 8/0494 |
| 12,308,494 | B2 * | 5/2025 | Han | H01M 16/006 |
| 2012/0035796 | A1 * | 2/2012 | Jeon | B60K 6/32 180/65.265 |
| 2016/0129807 | A1 * | 5/2016 | Okamoto | B60L 3/04 340/425.5 |
| 2018/0345819 | A1 * | 12/2018 | Cai | B60L 58/31 |
| 2019/0126770 | A1 * | 5/2019 | Koch | B60L 58/12 |
| 2020/0235440 | A1 * | 7/2020 | Hao | H01M 10/441 |
| 2021/0284043 | A1 * | 9/2021 | Wang | B60L 53/53 |
| 2022/0134817 | A1 | 5/2022 | Boisset et al. | |
| 2022/0158269 | A1 * | 5/2022 | Pettersson | H01M 10/6568 |
| 2022/0293978 | A1 * | 9/2022 | Champagne | B60K 1/00 |
| 2022/0314817 | A1 * | 10/2022 | Igarashi | B60L 58/12 |
| 2023/0054685 | A1 * | 2/2023 | Lelli | H01M 10/0585 |
| 2023/0091154 | A1 * | 3/2023 | Gao | B60L 50/64 180/65.1 |
| 2023/0131786 | A1 * | 4/2023 | Del Core | B60L 50/10 320/136 |
| 2023/0142289 | A1 * | 5/2023 | Wang | H01M 10/486 429/90 |
| 2023/0182585 | A1 * | 6/2023 | Koti | B60L 58/32 307/10.1 |
| 2023/0238647 | A1 * | 7/2023 | Kuo | H01M 50/30 429/82 |
| 2023/0302922 | A1 * | 9/2023 | Turlapati | G01R 31/382 |
| 2023/0322127 | A1 * | 10/2023 | Telford | B60L 15/2045 701/22 |
| 2023/0322198 | A1 * | 10/2023 | Telford | B60L 15/2045 701/22 |
| 2023/0322203 | A1 * | 10/2023 | Telford | B60L 15/2045 701/22 |
| 2023/0322204 | A1 * | 10/2023 | Telford | B60L 15/2045 701/22 |
| 2023/0395947 | A1 * | 12/2023 | Stojanovski | H01M 10/0413 |
| 2023/0415612 | A1 * | 12/2023 | Dunn | B60K 11/02 |
| 2024/0243415 | A1 * | 7/2024 | Battiato | H01M 50/289 |
| 2024/0270119 | A1 * | 8/2024 | Berels | B60L 50/66 |
| 2024/0297400 | A1 * | 9/2024 | Hickey | H01M 10/613 |
| 2024/0305101 | A1 * | 9/2024 | Borregard | H02J 3/001 |
| 2025/0112316 | A1 * | 4/2025 | Ringstad | H01M 50/258 |

* cited by examiner

HIERARCHICAL POWER CONTROL

CROSS-REFERENCE TO RELATED APPLICATION

This application claims priority to and the benefit of U.S. Provisional Patent Application No. 63/601,665, filed Nov. 21, 2023, which is incorporated herein by reference in its entirety for all purposes.

BACKGROUND

A hybrid fuel cell vehicle can include a storage for carrying hydrogen fuel and a fuel cell to convert the hydrogen fuel into electricity. The electricity can be used to power motor and other components to propagate the vehicle through an environment.

SUMMARY

The present disclosure relates to techniques for controlling powertrains in hybrid fuel cell vehicles. The vehicle can include a set of controllers arranged in accordance with a set of hierarchical layers defined by a controller topology. The controller topology can be used to achieve system level control using controllers to manage operation, power delivery, and other functionalities associated with a powertrain of the vehicle. The set of controller can include, for example, a supervisory controller, one or more fuel cell controllers, one or more battery managers, and one or more thermal managers, among others. The controller topology can be configured with more complex interfaces, with multiple power sources and higher input/output (I/O) specifications.

In one aspect of the disclosure, a system for vehicle power control is disclosed. The system includes a first controller arranged in a first hierarchical layer of a control topology, the first controller configured to control a first source of energy of a vehicle based on first data of the first source of energy, a second controller arranged in the first hierarchical layer of the control topology, the second controller configured to control a second source of energy of the vehicle based on second data of the second source of energy, and a third controller configured to receive the first data and the second data from the first hierarchical layer, generate a control signal based on the first data and the second data, and transmit the control signal to a component of the vehicle to control the component of the vehicle.

In some embodiments, the first source of energy includes a fuel cell stack, and the second source of energy includes a battery pack. The first controller is further configured to control the fuel cell stack, the second controller is further configured to control the battery pack, and the third controller is a supervisory controller configured to generate the control signal based on the first data and the second data.

In some embodiments, the component includes a sub-component of a powertrain of the vehicle, and the third controller is further configured to generate the control signal to control the sub-component of the powertrain of the vehicle. In some embodiments, the component includes at least one of a propulsion component of the vehicle, a navigation component of the vehicle, a power electronics, a converter, or a high-voltage component of the vehicle. The third controller is further configured to generate the control signal to control at least one of propulsion of the vehicle, navigation of the vehicle, the power electronics, the converter, or the high-voltage component of the vehicle.

In some embodiments, the first controller is configured to provide a first signal directly to the first source of energy based on the first data, and the second controller is configured to provide a second signal directly to the second source of energy based on the second data.

In some embodiments, the component includes an internal electrical energy source of the vehicle. The third controller is further configured to generate the control signal to control the internal electrical energy source of the vehicle.

In another aspect of the disclosure, a system for hierarchical vehicle control is disclosed. The system can include a plurality of first controllers arranged in a first hierarchical layer of a control topology. Each of the plurality of first controllers can manage a respective fuel cell stack of a plurality of fuel cell stacks. Each of the plurality of fuel cell stacks can provide electrical energy to a component in a vehicle. The system can include a plurality of second controllers coupled with a plurality of battery packs disposed in the vehicle Each of the plurality second controllers can manage a respective battery pack of the plurality of battery packs. The system can include a third controller coupled with the first plurality of controllers and the second plurality of controllers. The third controller can be arranged in a second hierarchical layer of the control topology. The third controller can interface with: (i) one or more of the plurality of first controllers and the plurality of second controllers and (ii) a vehicle powertrain configured to control propulsion of the vehicle.

In some embodiments, the system includes a plurality of fourth controllers arranged in a third hierarchical layer of the control topology, each of the plurality of fourth controllers configured to: (i) regulate at least one of an electrical control and a thermal manager for at least one of the plurality of fuel cell stacks and (ii) control one or more of the plurality of first controllers arranged in the first hierarchical layer. The third controller is further configured to indirectly interface with one or more of the plurality of first controllers via at least one of the plurality of fourth controllers.

In some embodiments, each of the plurality of first controllers are further configured to regulate an electrical control and a thermal manager for at least one of the plurality of fuel cell stacks.

In some embodiments, the system includes at least one fourth controller arranged in a third hierarchical layer of the control topology, the at least one fourth controller configured to: (i) regulate at least one of an electrical control and a thermal manager for at least one of the plurality of fuel cell stacks and (ii) control at least one first controller of the plurality of first controllers arranged in the first hierarchical layer. The third controller is further configured to: indirectly interface with the at least one first controller via the at least one fourth controller, directly interface with at least one other first controller of the plurality of first controllers, and regulate an electrical control and a thermal manager for at least one of the plurality of fuel cell stacks associated with the at least one other first controller.

In some embodiments, each of the plurality of first controllers are further configured to regulate an electrical control and a thermal manager for at least one of the plurality of fuel cell stacks. The third controller is further configured to: (i) manage the respective fuel cell stack of the plurality of fuel cell stacks and (ii) regulate, via interfacing with at least one of the plurality of first controllers, the electrical control and the thermal manager for at least one of the plurality of fuel cell stacks.

In some embodiments, in controlling the propulsion of the vehicle, the first controller is configured to control generation or conveyance of electrical power from one of the plurality of fuel cell stacks.

In some embodiments, the second hierarchical layer is higher in the control topology than the first hierarchical layer. At least one controller in the first hierarchical layer is configured to provide sensor data to the third controller, and the third controller is configured to generate a control signal based on the sensor data.

In some embodiments, each of the plurality of first controllers is further configured to manage the respective fuel cell stack including a balance of plant (BoP) mechanism configured to manage heat, ventilation, or power distribution. The BoP mechanism includes a thermal management system or an electrical module.

In some embodiments, the second hierarchical layer is a system level layer configured to supervise the first hierarchical layer, and the first hierarchical layer is an engine level layer or a module level layer associated with operation of the vehicle.

In some embodiments, the third controller is a supervisory controller configured to control functions related to the first controller or the second controller.

In yet another aspect of the disclosure, a method for powertrains of hybrid fuel cell vehicles is disclosed. The method includes identifying a plurality of first controllers in a first hierarchical layer of a control topology, each of the plurality of first controllers configured to control a first source of energy of a vehicle based on first data of the first source of energy, identifying a plurality of second controllers in the first hierarchical layer of the control topology, each of the plurality of second controllers configured to control a second source of energy of the vehicle based on second data of the second source of energy, coupling a third controller with the plurality of first controllers and the plurality of second controllers, receiving, by the third controller, the first data and the second data, generating, by the third controller, a control signal based on the first data and the second data, and transmitting the control signal to a component of the vehicle to control the component of the vehicle.

In some embodiments, the method includes controlling, by the third controller, via the control signal, (i) a subcomponent of a powertrain of the vehicle, (ii) a propulsion or navigation component of the vehicle, or (iii) a power electronics, a converter, or a high-voltage component of the vehicle.

In some embodiments, the method includes providing, by the first controller, a first signal to the first source of energy based on the first data, and providing, by the second controller, a second signal to the second source of energy based on the second data.

In some embodiments, the method includes controlling, by the third controller, via at least one of the plurality of first controllers, an electrical control and a thermal manager for at least one corresponding fuel cell stack.

It is to be understood that both the foregoing general description and the following detailed description are exemplary and explanatory only, and are not restrictive of the present teachings.

BRIEF DESCRIPTION OF THE DRAWINGS

The disclosure will become more fully understood from the following detailed description, taken in conjunction with the accompanying figures, wherein like reference numerals refer to like elements unless otherwise indicated, in which.

DETAILED DESCRIPTION

Following below are more detailed descriptions of various concepts related to, and implementations of, systems, methods, apparatuses, and devices for controlling power trains in vehicles. The various concepts introduced above and discussed in greater detail below may be implemented in any of a number of ways, as the described concepts are not limited to any particular manner of implementation. Examples of specific implementations and applications are provided primarily for illustrative purposes.

Presented herein are controller arrangements to achieve system level control using controllers to manage operation, power delivery, and other functionalities associated with hydrogen fuel cell powertrains in vehicles. A fuel cell module can include (i) a fuel cell power module (FCPM) and (ii) air handling including air plumbing, compressing, and flow sensing. The fuel cell module can be controlled using a FCPM or stack controller. A fuel cell engine (FCE) can include the fuel cell module and a balance of plant (BoP) mechanism that includes (i) a thermal management system to regulate heat and (ii) an electrical module to perform various electrical functions such as engine control, DC/DC converter, HV/LV connectors, and ventilation, among others. The fuel cell engine can be controlled using a fuel cell engine (FCE) module. A fuel cell powertrain can include one or more fuel cell engines (FCEs), together with a battery with a battery management system (BMS), hydrogen (H2) storage, and thermal management system, among other components. The overall powertrain can be controlled using a supervisory control module (SCM).

A number of different topologies and arrangements of these modules to effectively manage complex operations for a hydrogen fuel cell powertrain system to allow for support of multiple power sources, ability to handle different interfaces, and higher input/output (I/O) capabilities. The controller arrangements can be configured with more complex interfaces, with multiple power sources and higher input/output (I/O) specifications. The various controller modules described above can be arranged in a hierarchical manner to achieve operation management, power delivery, and other functionalities in fuel cell and/or diesel hybrid powertrains.

Figure 1:
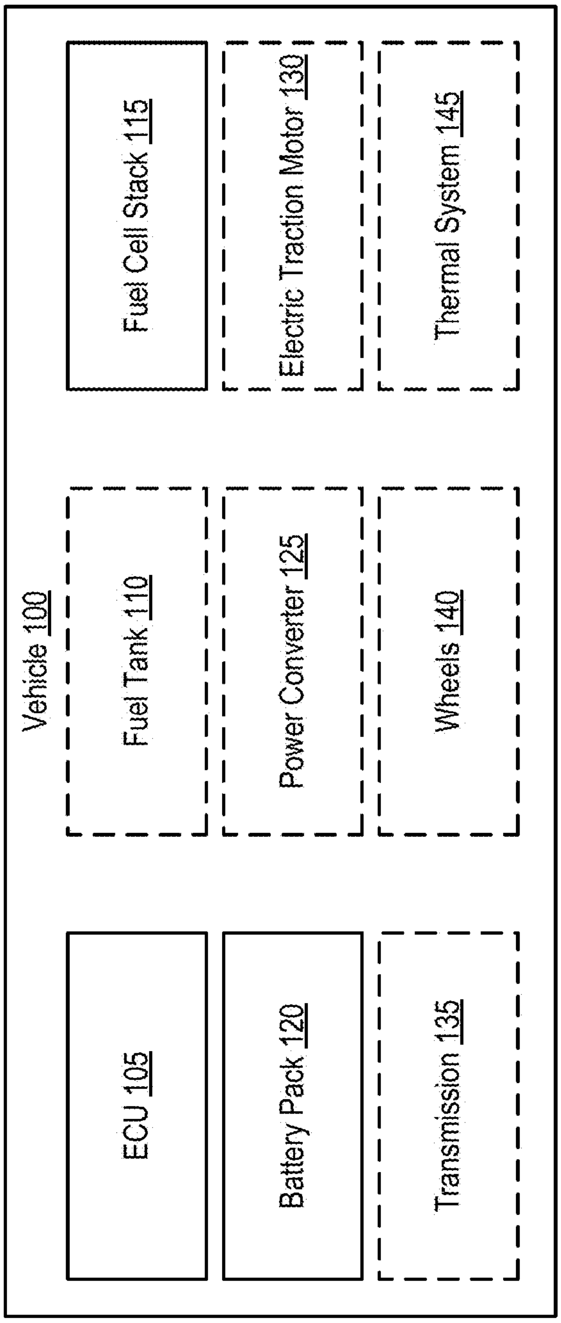
FIG. 1 depicts a block diagram of an example vehicle with a fuel cell and a powertrain in accordance with an illustrative embodiment.

FIG. 1 depicts a block diagram of an example vehicle 100 with a fuel cell and a powertrain in accordance with an illustrative embodiment. In brief overview, the vehicle 100 can contain, house, or otherwise include at least one electronics control unit (ECU) 105, at least one fuel tank 110, at least one fuel cell stack 115, at least one battery pack 120, at least one power converter 125, at least one electric traction motor 130, at least one transmission 135, and wheels 140, at least one thermal system 145, among others. The vehicle 100 may be any type of vehicle, such as an automobile (e.g., a sedan, a truck, a bus, or a van), a motorcycle, an airplane, a helicopter, a locomotive, or a watercraft, among others. In some implementations, the vehicle 100 may be a mining vehicle (e.g., a haul truck, a mining truck, an excavator, a wheel loader, etc.). In some implementations, although described as a "vehicle" the vehicle 100 may be various types of mining applications (e.g., drilling rigs, conveyor belts, crushers, hydraulic shovels, etc.). The vehicle 100 may be fuel cell hybrid vehicle (e.g., a fuel cell electric vehicle (FCEV)) powered by a hydrogen fuel cell and an internal electrical energy source, among others. The components can be situated, arranged, or otherwise disposed within any portion of the vehicle 100, such as a front region, a body (or chassis), or a rear region, among others.

The ECU 105 (sometimes herein referred to as an electronic control module (ECM), electronic controller, or controller) can manage, handle, or otherwise control various components within the vehicle 100. The ECU 105 can be situated, arranged, or otherwise disposed within an interior portion of the vehicle 100 (e.g., towards the front end as depicted). The ECU 105 can be structured to be electrically coupled with other components in the vehicle 100, such as the fuel tank 110, the fuel cell stack 115, the battery pack 120, the power converter 125, the electric traction motor 130, the transmission 135, and the thermal system 145, among others, to communicate measurement data and command signals. The ECU 105 can include one or more processors coupled with memory and software and capable of performing the various processes and tasks described herein. For example, the ECU 105 can be used to implement the functionalities detailed herein in connection with FIGS. 2-9.

The ECU 105 can include can be implemented using circuitry, such as one or more processors coupled with memory. The circuitry can include logic or machine-readable instructions to define the behavior, functions, and operations of the circuitry. The functions attributed or defined by the machine-readable instructions can be attributable to the circuitry overall. The circuitry can be implemented by computer readable media which can include code written in any programming language, including, but not limited to, Java, JavaScript, Python or the like and any conventional procedural programming languages, such as the "C" programming language or similar programming languages. The machine-readable instructions can be stored and maintained on memory. The circuitry can include one or more processors to execute the machine-readable instructions. The one or more processors can be coupled with the memory to execute the machine-readable instructions therefrom.

The processor can be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or any conventional processor, or state machine. The processor also may be implemented as a combination of computing devices, such as a combination of a digital signal processor (DSP) and a microprocessor, a plurality of microprocessors, one or more microprocessors in conjunction with a DSP core, or any other such configuration. In some embodiments, the one or more processors may be shared by multiple circuits may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution.

The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be communicably connected to the processor to provide computer code or instructions to the processor for executing at least some of the processes described herein. Moreover, the memory may be or include tangible, non-transient volatile memory or non-volatile memory. Accordingly, the memory may include database components, object code components, script components, or any other type of information structure for supporting the various activities and information structures described herein.

The fuel tank 110 (sometimes herein referred to as a fuel store or container) can store, house, or otherwise contain hydrogen fuel to be converted to electrical power for the various components in the vehicle 100. The hydrogen fuel can be molecular hydrogen, and can include, for example, gaseous hydrogen ($H_2$), liquid hydrogen ($H_2$), or a liquid organic hydrogen carrier, among others. The hydrogen fuel in the fuel tank 110 can serve or function as the primary source of energy for the vehicle 100. The fuel tank 110 can be situated, arranged, or otherwise disposed within an interior portion of the vehicle 100 (e.g., towards rear region as depicted). The fuel tank 110 can be electrically coupled with the ECU 105 to receive command signals therefrom. The fuel tank 110 can be mechanically or fluidly coupled with the fuel cell stack 115 to convey, relay, or otherwise provide the hydrogen fuel to the fuel cell stack 115 to be converted to electrical vehicle. The fuel tank 110 can be mechanically or fluidly coupled with a fuel filler to receive additional hydrogen fuel from a source external to the vehicle 100.

The fuel cell stack 115 (sometimes herein referred to as a hydrogen fuel cell stack, a hydrogen fuel cell, or a fuel cell) can contain, house, or include a set of fuel cells to transform or convert the hydrogen fuel from the fuel tank 110 to electrical power. The fuel cell stack 115 can be situated, arranged, or otherwise disposed within an interior portion of the vehicle 100 (e.g., towards a chassis portion as depicted). The fuel cell stack 115 can be mechanically or fluidly coupled with the fuel tank 110 to obtain, accept, or otherwise receive the hydrogen fuel therefrom. The fuel cell stack 115 can be electrically coupled with various components, such as the ECU 105, the battery pack 120, the power converter 125, the transmission 135, the electric traction motor 130, and the thermal system 145, among others, to provide electrical power.

The fuel cells within the fuel cell stack 115 can be coupled with one another in series, in parallel, or in a combination of series and parallel configurations. Each fuel cell can include: an anode, a cathode, and an electrolyte membrane. The anode can be supplied with the hydrogen fuel from which electrons are drawn. The cathode can be supplied with a gaseous material (e.g., oxygen ($O_2$)) to pull electrons from the anode side. The electrolyte membrane can convert electricity from the electrons of hydrogen and can produce water ($H_2O$) to be carried out via the cathode. The set of fuel cells can be in accordance with any configuration, such as a proton exchange membrane (PEM) fuel cell, a solid oxide fuel cell (SOFC), a solid alkaline fuel cells (SAFC), and molten-carbonate fuel cell (MCFC), among others. The fuel cell stack 115 can relay, convey, or otherwise provide the electrical power from the individual fuel cells to the other components in the vehicle 100. The electrical power from the fuel cell stack 115 can be in the form of direct current (DC) power.

The battery pack 120 can contain, house, or include a set of battery cells to store and maintain electrical power to provide to other components electrically coupled thereto. The battery pack 120 can serve or function as a secondary source of power for the vehicle 100. The set of battery cells in the battery pack 120 can be of any type, such as a lithium-ion battery cell, a lithium polymer cell, a solid state battery cell, a nickel metal battery cell, and sodium ion battery cell, among others. The battery pack 120 can include a housing or a container in which to store or arrange the set of battery cells. The battery pack 120 can be situated, arranged, or otherwise disposed within an interior portion of the vehicle 100 (e.g., towards the rear region of the vehicle 100 as depicted). The battery pack 120 can electrically be coupled with the ECU 105, the fuel cell stack 115, the power converter 125, the electric traction motor 130, the transmission 135, and the thermal system 145, among others, to convey or receive electrical power. The battery cells in the battery pack 120 can receive electrical power for storage from a source external to the vehicle 100 or can draw electrical power from other components (e.g., from the transmission 135 during regenerative braking).

The power converter 125 can handle, administer, or otherwise manage flow of electrical power conveyed to various components in the vehicle 100. The power converter 125 can be electrically coupled with the fuel cell stack 115 the battery pack 120 to receive the electrical power conveyed therefrom. The power converter 125 can be a direct current to direct current (DC/DC) converter to adjust, change, or otherwise transform the electric power from one DC voltage to a target DC voltage for provision to another component (e.g., from battery pack 120 to power other components) in the vehicle 100. The power converter 125 can be a direct current to alternating current (DC/AC) converter to adjust, change, or otherwise transform the electric power from one DC voltage to a target AC voltage to provide to another component (e.g., to move the electric traction motor 130 or to draw power from the electric traction motor 130 via regenerative braking) in the vehicle 100. The power converter 125 can be electrically coupled with the ECU 105, the electric traction motor 130, the transmission 135, and the thermal system 145, among others to convey the transformed electric power. The power converter 125 can be situated, arranged, or otherwise disposed in an interior portion of the vehicle 100 (e.g., toward the front end as depicted).

The electric traction motor 130 can convert or transform electrical power to mechanical power to rotate, turn, or drive the set of wheels 140 to propel or navigate the vehicle 100 through the environment. The electric traction motor 130 can be electrically coupled with the fuel cell stack 115 and the battery pack 120 via the power converter 125 to receive the electrical power. The electric traction motor 130 can be for a hybrid hydrogen fuel cell vehicle, and can control drawing of electrical power from the fuel cell stack 115 to consume hydrogen fuel or from the battery pack 120 for the electrical power stored therein. The electric traction motor 130 can be electrically coupled with the ECU 105 to exchange data, such as control signals and measurement data. The electric traction motor 130 can be mechanically coupled with the wheels 140 via the transmission 135. The electric traction motor 130 can be situated, arranged, or otherwise disposed in an interior portion of the vehicle 100 (e.g., toward the front end as depicted). The motor used for the electric traction motor 130 can include, for example, a synchronous electric motor (e.g., a permanent-magnet synchronous motor (PMSM)), an asynchronous electric motor (e.g., an induction motor), brushless direct current motor (BLDC), and a switched reluctance motor (SRM)

The transmission 135 can handle, administer, or otherwise manage conveyance of power from the electric traction motor 130 to the wheels 140. The transmission 135 can control a speed, acceleration, and torque of the vehicle 100 in driving through the environment. The transmission 135 can be electrically coupled with can be electrically coupled with the fuel cell stack 115 and the battery pack 120 via the power converter 125 to receive the electrical power. The transmission 135 can be electrically coupled with the ECU 105 to exchange data, such as control signals and measurement data. The transmission 135 can be mechanically coupled between the electric traction motor 130 and the wheels 140 to convey mechanical power. The transmission 135 can be situated, arranged, or otherwise disposed in an interior portion of the vehicle 100 (e.g., toward the front end as depicted).

The transmission 135 can include, for example, at least one gear box, at least one clutch, at least one actuator, at least one driveshaft, and at least one differential, among other components. The gear box can include a set of gears of varying sizes to allow for selection of different gear ratios. The clutch can control gear changes in the gear box and power distribution to the wheels 140. The actuator can control engagement and disengagement of clutches and controlling gear shifts. The driveshaft can control transfer of power (e.g., in the form of torque) to the wheels 140 via the axles in the vehicle 100. The differential can allow the wheels 140 to rotate at different speeds at a specified torque.

The various components of the transmission 135 can be controlled from the ECU 105 or a transmission control unit in the transmission 135.

Each of the set of wheels 140 can be a generally circular or cylindrical component to be rotated to propel or navigate the vehicle 100 through the environment. The set of wheels 140 can be in direct contact with the driving surface of the environment. The set of wheels 140 can be mechanically coupled with the electric traction motor 130 via the transmission 135 and other components (e.g., axles) in the vehicle 100. Each wheel 140 can be electrically coupled with the fuel cell stack 115 and the battery pack 120 to receive electric power. Each wheel 140 can be electrically coupled with the ECU 105 to exchange data, such as sensor data and control signals. Each wheel 140 can also include: a tire fitted on an outer rim of the circular component; a suspension to maintain stability and distance between a body portion of the vehicle 100 and the driving surface; and a braking to apply friction to reduce rotation of the wheel 140, among others.

The thermal system 145 (sometimes referred herein as a cooling system) can handle, regulate, or otherwise maintain a temperature of various components in the vehicle 100 within a target range of temperatures for each respective component. The thermal system 145 can include radiators, heat exchangers, fans, and coolant distributor to draw thermal energy out from the components in the vehicle 100. For example, the thermal system 145 can provide coolant via a set of pipes to a cold plate thermally coupled with the fuel cell stack 115 to regulate the temperature of the fuel cell stack 115 while operating. The coolant can be, for example: deionized (DI) water, glycol-water mixture, liquid hydrogen, and two-phase coolant, among others. The thermal system 145 can be electrically coupled with the ECU 105 to exchange data and control signals and with the fuel cell stack 115 and the battery pack 120, among others, to convey electrical power. The thermal system 145 can be thermally coupled with various components in the vehicle 100, such as the fuel tank 110, fuel cell stack 115, the battery pack 120, the power converter 125, the transmission 135, and the electric traction motor 130, among others, to draw thermal energy therefrom.

Figure 2:
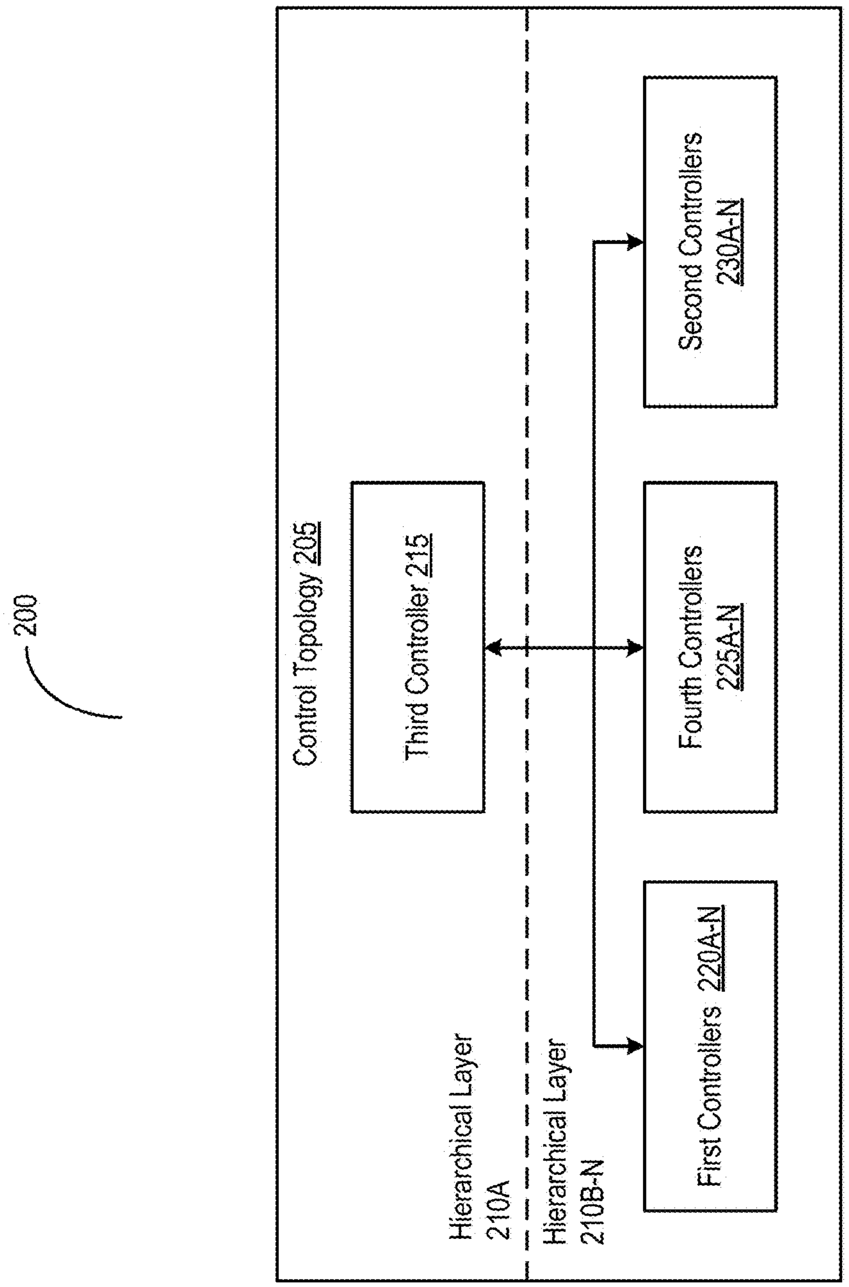
FIG. 2 depicts a block diagram of a system for controlling powertrains of hybrid fuel cell vehicles in accordance with an illustrative embodiment.

Referring now to FIG. 2, among others, depicted is a block diagram of a system 200 for controlling powertrains of hybrid fuel cell vehicles. In overview, the system 200 can include at least one control topology 205. The control topology 205 can identify or include a set of hierarchical layers 210A-N (hereinafter generally referred to as layers 210, or levels). The system 200 can include one or more controllers, such as at least one third controller 215 (sometimes herein referred to as a supervisory controller), a set of first controllers 220A-N (hereinafter generally referred to as a first controller 220, and sometimes referred herein as a first energy source controller and/or a fuel cell stack controller), a set of fourth controllers 225A-N (hereinafter generally referred to as a fourth controller 225, and sometimes referred herein as fuel cell engine controllers), and a set of second controllers 230A-N (hereinafter generally referred to as second controller 230, and sometimes herein referred to as a second energy source controller, battery controllers, and/or battery managers), among others. The controllers can be arranged across the set of hierarchical layers 210, such as in accordance with the topologies as detailed herein in conjunction with FIGS. 6-10. In some embodiments, the controllers can be used to implement any one or more of the functionalities of the third controller 215, the first controllers 220, the fourth controllers 225, and the second controllers 230, among others. For example, one controller may be embedded with the third controller 215 and the first controller 220 to carry out the functionalities of these controllers. In some implementations, the system 200 is configured to control operation of one or more components and/or subsystems of a diesel hybrid vehicle. In some implementations, the system 200 is configured to control operation of one or more components and/or subsystems of a fuel cell-based vehicle. For example, the hierarchical structure of the control topology 205 can allow for the system 200 to be implemented on various types of powertrains, such as to facilitate abstraction of energy source control techniques using the first controllers 220 and second controllers 230 and allowing the third controller 215 to manage higher level functionality.

In some embodiments, the system 200 may include a plurality of first controllers 220 arranged in a second hierarchical layer 210B of the control topology 205. Each of the plurality of first controllers 220 can control a first source of energy (e.g., a fuel cell stack) of the vehicle 100. Each of the plurality of first controllers 220 can manage a respective fuel cell stack of a plurality of fuel cell stacks. Each of the plurality of fuel cell stacks can provide electrical energy to a component in the vehicle. In some embodiments, each of the plurality of first controllers 220 can control the first source of energy of the vehicle 100 based on data of the first source of energy. For example, the first controllers 220 can provide a first signal directly to the first source of energy based on the data of the first source of energy. In some embodiments, the system 200 may include a plurality of second controllers 230 arranged in the second hierarchical layer 210B of the control topology 205. Each of the plurality of second controllers 230 can control a second source of energy (e.g., a battery) of the vehicle 100. For example, the second controllers 230 can provide a second signal directly to the second source of energy based on the data of the second source of energy. The plurality of second controllers 230 can be coupled with a plurality of battery packs disposed in the vehicle 100. Each of the plurality second controllers 230 can manage a respective battery pack of the plurality of battery packs. In some embodiments, each of the plurality of second controllers 230 can control the second source of energy of the vehicle 100 based on data of the second source of energy. The system can include a third controller 215 coupled with the first plurality of controllers 220 and the second plurality of controllers 230. The third controller 215 can be arranged in a first hierarchical layer 210A of the control topology 205. The third controller 215 can interface with: (i) one or more of the plurality of first controllers 220 and the plurality of second controllers 230 and (ii) the vehicle powertrain configured to control propulsion of the vehicle. In some embodiments, the third controller 215 can receive the data of the first source of energy and/or the data of the second source of energy. For example, the third controller 215 can receive the data from the second hierarchical layer 210B. In some embodiments, the third controller 215 can generate a control signal based on the data (e.g., of the first source of energy and/or of the second source of energy). In some embodiments, the third controller 215 can transmit the control signal to a component of the vehicle 100 to control the component of the vehicle 100. In some embodiments, the component of the vehicle 100 can include a sub-component of a powertrain of the vehicle 100. The third controller 215 can generate the control signal to control the sub-component of the power train of the vehicle 100. In some embodiments, the component of the vehicle 100 can include a propulsion component of the vehicle, a navigation component of the vehicle, a power electronics, a converter, or a high-voltage component of the vehicle. The third controller can generate the control signal to control one of propulsion of the vehicle, navigation of the vehicle, the power electronics, the converter, or the high-voltage component of the vehicle. In some embodiments, the component of the vehicle 100 can include an internal electrical energy source of the vehicle 100. The third controller 215 can generate the control signal to control the internal electrical energy source of the vehicle 100.

In some embodiments, the first source of energy includes a fuel cell stack. The first controller 220 can control the fuel cell stack. In some embodiments, the second source of energy includes a battery pack. The second controller 230 can control the battery pack. In some embodiments, the third controller 215 can be a supervisory controller configured to generate the control signal based on the data of the first source of energy (e.g., the fuel cell stack) and/or the data of the second source of energy (e.g., the battery pack).

In some embodiments, the system 200 can include the plurality of fourth controllers 225 arranged in a third hierarchical layer 215C of the control topology 205. Each of the plurality of fourth controllers 225 can (i) regulate at least one of an electrical control and a thermal manager for at least one of the plurality of fuel cell stacks and (ii) control one or more of the plurality of first controllers 220 arranged in the second hierarchical layer 210B. The third controller 215 can indirectly interface with one or more of the plurality of first controllers 220 via at least one of the plurality of fourth controllers 225. In some embodiments, each of the plurality of first controllers 220 can regulate an electrical control and a thermal manager for at least one of the plurality of fuel cell stacks.

In some embodiments, the system 200 can include at least one fourth controller 225 arranged in a third hierarchical layer 215C of the control topology 205. The at least one fourth controller 225 can (i) regulate at least one of an electrical control and a thermal manager for at least one of the plurality of fuel cell stacks and (ii) control at least one first controller of the plurality of first controllers 220 arranged in the second hierarchical layer 210B. The third controller 215 can indirectly interface with the at least one first controller 220 via the at least one fourth controller 225. The third controller 215 can directly interface with at least one other first controller of the plurality of first controllers 220. The third controller 215 can regulate an electrical control and a thermal manager for at least one of the plurality of fuel cell stacks associated with the at least one other first controller 220.

In some embodiments, each of the plurality of first controllers 220 can regulate an electrical control and a thermal manager for at least one of the plurality of fuel cell stacks. The third controller 215 can: (i) manage the respective fuel cell stack of the plurality of fuel cell stacks and (ii) regulate, via interfacing with at least one of the plurality of first controllers 220, the electrical control and the thermal manager for at least one of the plurality of fuel cell stacks. In some embodiments, the third controller 215 can control a power electronics to operate the plurality of battery packs and a propulsion component for the propulsion of the vehicle. In some embodiments, in controlling the propulsion of the vehicle 100, the first controllers 220 can control generation or conveyance of electrical power from one of the plurality of fuel cell stacks.

In some embodiments, the first hierarchical layer 210A is higher in the control topology 205 than the second hierarchical layer 210B. At least one controller in the second hierarchical layer 210B can provide data (e.g., sensor data, data of the first source of energy, data of the second source of energy, etc.) to the third controller 215. The third controller 215 can generate a control signal based on the data. In some embodiments, the first hierarchical layer 210A can be a system level layer configured to supervise the second hierarchical layer 210B. For example, the third controller 215 can be a supervisory controller configured to control functions related to the first controller 220 and/or the second controller 230. The second hierarchical layer 210B can be an engine level layer or a module level layer associated with operation of the vehicle 100.

The control topology 205 (e.g., including the layers 210, the third controller 215, the first controllers 220, the fourth controllers 225, and the second controllers 230) and the system 200 can be implemented using circuitry, such as one or more processors coupled with memory, such as those in the ECU 105 of the vehicle 100. The circuitry can include logic or machine-readable instructions to define the behavior, functions, and operations of the circuitry. The functions attributed or defined by the machine-readable instructions can be attributable to the circuitry overall. The circuitry can be implemented by computer readable media which can include code written in any programming language, including, but not limited to, Java, JavaScript, Python or the like and any conventional procedural programming languages, such as the "C" programming language or similar programming languages. The machine-readable instructions can be stored and maintained on memory. The circuitry can include one or more processors to execute the machine-readable instructions. The one or more processors can be coupled with the memory to execute the machine-readable instructions therefrom.

The processor can be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or any conventional processor, or state machine. The processor also may be implemented as a combination of computing devices, such as a combination of a digital signal processor (DSP) and a microprocessor, a plurality of microprocessors, one or more microprocessors in conjunction with a DSP core, or any other such configuration. In some embodiments, the one or more processors may be shared by multiple circuits may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution.

The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be communicably connected to the processor to provide computer code or instructions to the processor for executing at least some of the processes described herein. Moreover, the memory may be or include tangible, non-transient volatile memory or non-volatile memory. Accordingly, the memory may include database components, object code components, script components, or any other type of information structure for supporting the various activities and information structures described herein.

In the system 200, the third controller 215 can be situated, deployed, or otherwise arranged in a first hierarchical layer 210A (sometimes referred herein as a system layer or system level) of the set of layers 210 in the control topology 205. The third controller 215 can be coupled with the set of first controllers 220, the set of fourth controllers 225, or the set of second controllers 230, among others. The third controller 215 can interface with one or more of: the set of first controllers 220, the set of fourth controllers 225, or the set of second controllers 230, among other. By interfacing, the third controller 215 can communicate data with the controllers in the other hierarchical layers 210B-N of the control topology 205. For example, the third controller 215 can relay, convey, or otherwise send control signals to the other controllers. The third controller 215 can accept, obtain, or otherwise receive feedback and sensor data from the other controllers. In some embodiments, the third controller 215 can interface with at least one controller in one hierarchical layer 210 (e.g., the third hierarchical layer 210C) indirectly via at least one other controller in another hierarchical layer 210 (e.g., the second hierarchical layer 210B). In some embodiments, the third controller 215 can directly interface with at least one controller in another hierarchical layer 210 (e.g., the second hierarchical layer 210B).

The third controller 215 can also interface with a vehicle powertrain (e.g., the fuel tank 110, the battery pack 120, the power converter 125, the electric traction motor 130, the transmission 135, and the thermal system 145) to control propulsion or navigation of the vehicle 100. In some embodiments, the third controller 215 can interface with components of the vehicle powertrain indirectly (e.g., through one of the other controllers). In some embodiments, the third controller 215 can directly interface with the components of the vehicle powertrain. By interfacing, the third controller 215 can data with the vehicle powertrain. The third controller 215 can accept, obtain, or otherwise receive feedback and sensor data from the vehicle powertrain. The third controller 215 can relay, convey, or otherwise send control signals to the vehicle powertrain.

In some embodiments, the third controller 215 can administer, handle, or otherwise control a power electronics (e.g., the power converter 125) to operate one or more battery packs (e.g., the battery pack 120) and at least one electric traction motor (e.g., the electric traction motor 130) in the vehicle 100. In some embodiments, the power electronics may be a part of the vehicle powertrain or a component separate from the vehicle powertrain. In some embodiments, the third controller 215 can interface with components of the power electronics indirectly (e.g., through one of the other controllers). In some embodiments, the third controller 215 can directly interface with the power electronics. By interfacing, the third controller 215 can data with the power electronics. The third controller 215 can accept, obtain, or otherwise receive feedback and sensor data from the other power electronics. Using the data, the third controller 215 can calculate, determine, or otherwise generate controls to be applied or provided. The third controller 215 can relay, convey, or otherwise send control signals to the vehicle power electronics.

The set of first controllers 220 (sometimes referred herein fuel cell power module (FCPM) controllers) can be situated, deployed, or otherwise arranged in another hierarchical layer 210B-N (sometimes herein referred as a module layer or a module level) in the control topology 205. The hierarchical layer 210B-N in which the set of first controllers 220 is arranged can correspond to a layer or level below the first hierarchical layer 210A in which the third controller 215 is arranged. Each first controller 220 can handle, administer, or other manage at least one respective fuel cell stack (e.g., the fuel cell stack 115) to convey, relay, or otherwise provide electrical energy to other components in the vehicle 100. The first controller 220 can interface with the respective fuel cell stack. By interfacing, the first controller 220 can accept, obtain, or otherwise receive feedback and sensor data from the fuel cell stack 115. Using the data, the first controller 220 can calculate, determine, or otherwise generate controls to be applied or provided. The first controller 220 can relay, convey, or otherwise send control signals to the fuel cell stack 115.

The set of fourth controllers 225 can be situated, deployed, or otherwise arranged in another hierarchical layer 210B-N (sometimes herein referred as an engine layer or an engine level) in the control topology 205. The hierarchical layer 210B-N in which the set of first controllers 220 is arranged can correspond to a layer or level below the first hierarchical layer 210A in which the third controller 215 is arranged. Each fourth controller 225 can handle, manage, or otherwise regulate an electronic control (e.g., power converter 125) or a thermal manager (e.g., the thermal system 145) for one or more fuel cell stacks (e.g., the fuel cell stack 115) in the vehicle 100. The fourth controller 225 can obtain, accept, or otherwise receive sensor data and feedback from the electronic control and the thermal manager. Using the data, the fourth controller 225 can calculate, determine, or otherwise generate controls to be applied or provided. The fourth controller 225 can convey, relay, or otherwise send the control signals to the electronic control and the thermal manager. The fourth controller 225 can handle, manage, or otherwise control another controller in another hierarchical layer 210, such as at least one of the first controllers 220.

The set of second controllers 230 can be situated, deployed, or otherwise arranged in another hierarchical layer 210B-N (sometimes herein referred as a module layer or a module level) in the control topology 205. The hierarchical layer 210B-N in which the set of first controllers 220 is arranged can correspond to a layer or level below the first hierarchical layer 210A in which the third controller 215 is arranged. Each second controller 230 can handle, administer, or otherwise manage at least one respective battery pack (e.g., the battery pack 120) in the vehicle 100. The second controller 230 can obtain, accept, or otherwise receive sensor data and feedback from the battery pack. Using the data, the second controller 230 can calculate, determine, or otherwise generate controls to be applied or provided. The second controller 230 can convey, relay, or otherwise send control signals to the battery pack.

Figure 3:
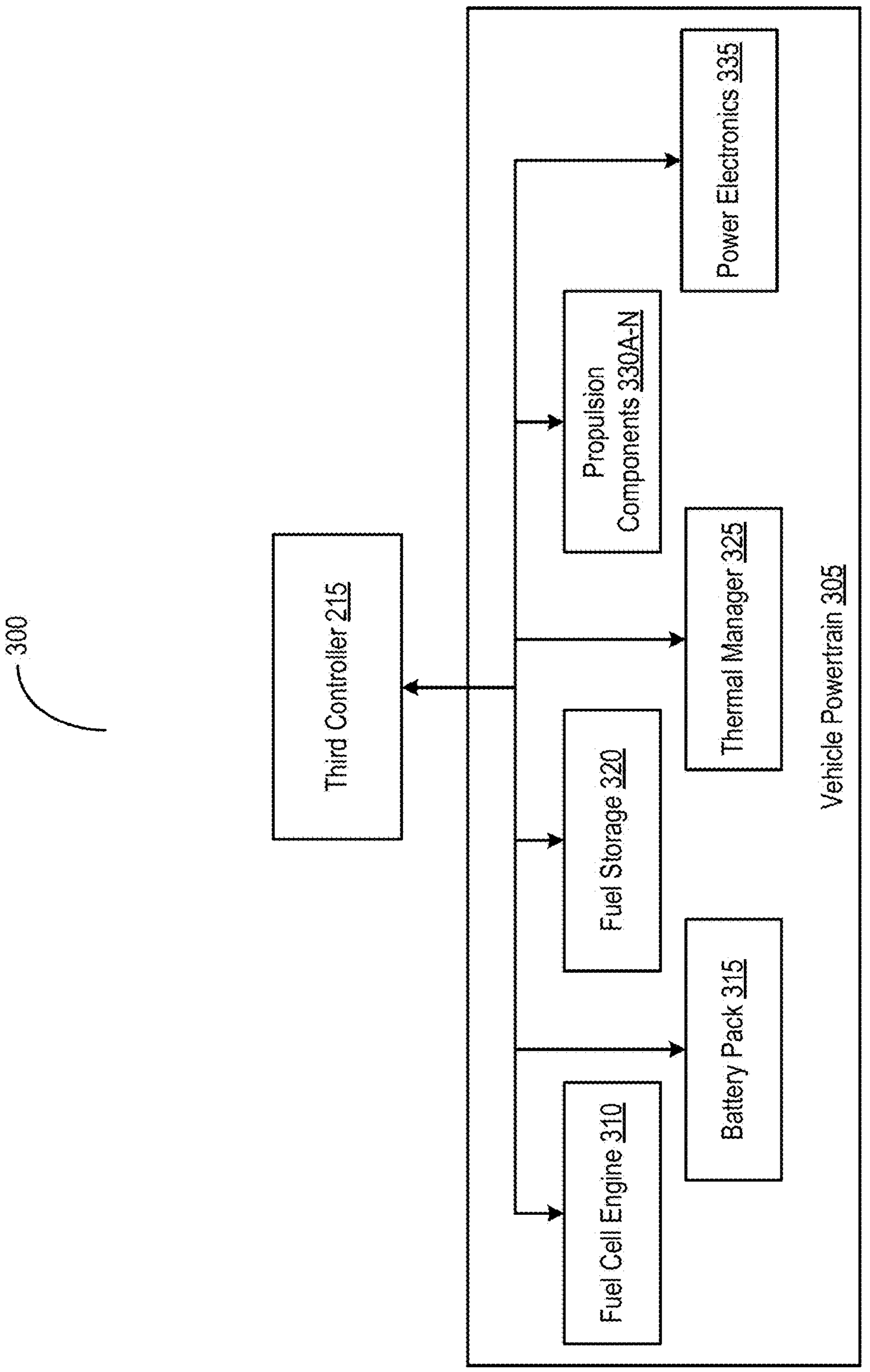
FIG. 3 depicts a block diagram of an architecture for a third controller in a vehicle in accordance with an illustrative embodiment.

Referring now to FIG. 3, among others, depicted is a block diagram of an architecture 300 for the third controller 215 in the vehicle 100. In brief overview, the architecture 300 (sometimes referred herein as a system level architecture) can include the third controller 215 and at least one vehicle powertrain 305. The architecture 300 can be arranged in at least one of the hierarchical layers 210 (e.g., the top hierarchical layer 210A) of the control topology 205 for the vehicle 100. The vehicle powertrain 305 can correspond to or include at least one fuel cell engine 310, at least one battery pack 315, at least one fuel storage 320, at least one thermal manager 325, a set of propulsion components 330A-N (hereinafter generally referred herein as propulsion components 330), and at least one power electronics 335, among others. The third controller 215 can handle, manage, or otherwise control one or more control components of the vehicle powertrain 305. The third controller 215 can interface the vehicle powertrain 305 (e.g., the components) to control propulsion or navigation of the vehicle 100. In interfacing, the third controller 215 can retrieve, identify, or otherwise receive data (e.g., sensor data and feedback) from the components of the vehicle powertrain 305. The third controller 215 can relay, convey, or otherwise send data (e.g., a control signal) to the components of the vehicle powertrain 305. The components of the vehicle powertrain 305 can be instance of the components detailed herein above in conjunction with FIG. 1.

In the vehicle powertrain 305, the fuel cell engine 310 can correspond to or include one or more components to administer, handle, or otherwise control one or more fuel cell stacks (e.g., instances of the fuel cell stack 115). The one or more components can be part of the vehicle 100 and at least partially implemented using circuitry (e.g., the ECU 105 as discussed above or elsewhere) in the vehicle 100. The fuel cell engine 310 can be coupled with the third controller 215 to interface and communicate with the third controller 215. In interfacing, the fuel cell engine 310 can convey, relay, or otherwise send sensor data and feedback data to the third controller 215. The fuel cell engine 310 can also retrieve, identify, or otherwise receive control signals from the third controller 215, or other controllers. Additional details regarding the fuel cell engine 310 are provided herein below in conjunction with FIG. 4.

The battery pack 315 can contain, house, or include a set of battery cells to store and maintain electrical power to provide to other components electrically coupled therewith in the vehicle 100. The battery pack 315 can be an instance of the battery pack 120 as discussed above. The battery pack 315 can be coupled with the third controller 215 to interface and communicate with the third controller 215. In interfacing, the battery pack 315 can convey, relay, or otherwise send sensor data and feedback data to the third controller 215. The data from the battery pack 315 can include, for example: a temperature; coolant temperature; state of charge; voltage output; power output; and internal pressure, among others. The battery pack 315 can also retrieve, identify, or otherwise receive control signals from the third controller 215, or other controllers. The control signals can include, for example: a command to set or adjust (e.g., increase or decrease) output power; a command to modify coolant flow; or a command to enable or disable (e.g., turning on and off) battery cells within the battery pack 315, among others.

The fuel storage 320 can store, house, or otherwise contain hydrogen fuel to be converted to electrical power for the various components in the vehicle 100. The fuel storage 320 can be an instance of the fuel storage 320 as discussed above. The fuel storage 320 can be coupled with the third controller 215 to interface and communicate with the third controller 215. In interfacing, the fuel storage 320 can convey, relay, or otherwise send sensor data and feedback data to the third controller 215. The data from the fuel storage 320 can include, for example: hydrogen pressure; temperature; volume; flow rate; valve status; and weight, among others. The fuel storage 320 can also retrieve, identify, or otherwise receive control signals from the third controller 215, or other controllers. The control signals can include, for example: a command to set or adjust (e.g., increase or decrease) hydrogen flow rate; a command to change temperature; and a command to enable or disable (e.g., turn on or shut down) the fuel storage 320, among others.

The thermal manager 325 can handle, regulate, or otherwise maintain a temperature of various components in the vehicle 100 within a target range of temperatures for each respective component. The thermal manager 325 can be an instance of the thermal system 145 as discussed above. The thermal manager 325 can be coupled with the third controller 215 to interface and communicate with the third controller 215. In interfacing, the thermal manager 325 can convey, relay, or otherwise send sensor data and feedback data to the third controller 215. The data from the thermal manager 325 can include, for example: a temperature of various components in the vehicle 100 (e.g., the fuel cell stack 115, the battery pack 120, and the transmission 135); a temperature of the coolant; a coolant flow rate; and a status of heat exchangers, radiators, and fans, among others. The thermal manager 325 can also retrieve, identify, or otherwise receive control signals from the third controller 215, or other controllers. The control signals can include, for example: a command to change (e.g., increase or decrease) coolant flow rate; a command to enable or disable (e.g., activate or deactivate) heat exchanges, radiators, fans, or coolant flow; or a command to enable or disable components (e.g., at least a portion of the fuel cell stack 115 or the battery pack 315) in the vehicle 100, among others.

The set of propulsion component 330 can one or more components to convert electrical power to mechanical power to control propulsion or navigation of the vehicle 100 through the environment. The propulsion components 330 can include instances of the power converter 125, the electric traction motor 130, the transmission 135, and the wheels 140, among others, as discussed above. Each of the propulsion components 330 can be coupled with the third controller 215 to interface and communicate with the third controller 215. In interfacing, each propulsion components 330 can convey, relay, or otherwise send sensor data and feedback data to the third controller 215. The data from the propulsion component 330 can include, for example: a speed, a temperature, a torque, and power from the electric traction motor 130; a gear ratio, a shift position, a fluid temperature, a rotation speed from the transmission 135; a speed of driveshaft; a wheel speed; an axle temperature; a differential temperature; vibration; suspension measurements; brake usage; and torque distribution, among others. The propulsion component 330 can also retrieve, identify, or otherwise receive control signals from the third controller 215, or other controllers. The control signals can include, for example: a command for gear selection; a command to shift gears; a command to control torque in the motor; a command to set power output; a command for regenerative braking; a command for braking system; and a command for suspension control; among others.

The power electronics 335 can administer, configure, or otherwise manage a distribution of electrical power throughout the components in the vehicle 100. The components of the power electronics 335 can be situated, arranged, or otherwise disposed in an interior portion of the vehicle 100. The power electronics 335 can include an instance of the power converter 125 as discussed above. In some embodiments, the controls for the power electronics 335 can be a part of the third controller 215. The power electronics 335 can be coupled with the third controller 215 to interface and communicate with the third controller 215. In interfacing, the power electronics 335 can convey, relay, or otherwise send sensor data and feedback data to the third controller 215. The data from the power electronics 335 can include, for example: a measurement of voltage, a measurement of current, or a measurement of power over time at each component in the vehicle 100, among others. The power electronics 335 can also retrieve, identify, or otherwise receive control signals from the third controller 215, or other controllers. The control signals can include, for example: a command to set or adjust (e.g., increase or decrease) voltage, current, or power at each component; and a command to configure distribution of voltage, current, or power among the components in the vehicle 100, among others.

Figure 4:
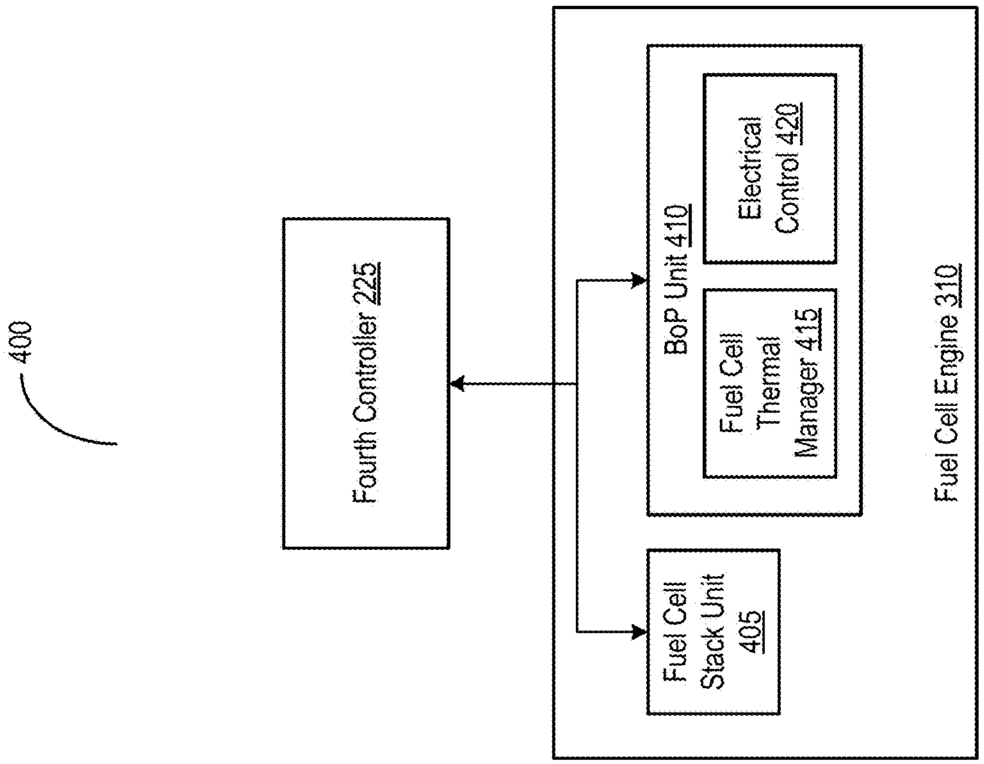
FIG. 4 depicts a block diagram of an architecture for a fourth controller in a vehicle, in accordance with an illustrative embodiment.

Referring now to FIG. 4, among others, depicted is a block diagram of an architecture 400 for the fourth controller 225 in the vehicle 100. The architecture 400 (sometimes referred herein as an engine level architecture) can include the fourth controller 225 and the fuel cell engine 310. The architecture 400 can be arranged in at least one of the hierarchical layers 210 of the control topology 205 for the vehicle 100. The fuel cell engine 310 can include at least one fuel cell stack unit 405 and at least one balance of plant (BoP) unit 410, among others. The BoP unit 410 can include at least one fuel cell thermal manager 415 (sometimes herein referred toas a fuel cell thermal management system or FC-TMS) and at least one electrical control 420 (sometimes referred herein as an electrical module), among others. In some embodiments, the fuel cell engine 310 can include a single instance of the fuel cell stack unit 405 (e.g., as depicted) or multiple instances of the fuel cell stack unit 405. The fuel cell engine 310 can be at least partially implemented using circuitry (e.g., the ECU 105 as discussed above or elsewhere) in the vehicle 100.

In the fuel cell engine 310, the fuel cell stack unit 405 can correspond to or include one or more components to administer, handle, or otherwise control fuel cell stack (e.g., the fuel cell stack 115) and related components (e.g., the fuel tank 110 or fuel storage 320). The one or more components of the fuel cell stack unit 405 can be part of the vehicle 100 and at least partially implemented using circuitry (e.g., the ECU 105 as discussed above or elsewhere) in the vehicle 100. The fuel cell stack unit 405 can be coupled with the fourth controller 225 to interface and communicate with the fourth controller 225. In interfacing, the fuel cell stack unit 405 can convey, relay, or otherwise send sensor data and feedback data to the fourth controller 225. The fuel cell stack unit 405 can also retrieve, identify, or otherwise receive control signals from the fourth controller 225, or other controllers. Additional details regarding the fuel cell stack unit 405 are provided herein below in conjunction with FIG. 5.

The BoP unit 410 can correspond to or include one or more components to administer, control, or otherwise regulate various operations of the fuel cell stack (e.g., the fuel cell stack 115) in the vehicle 100. The one or more components of the BoP unit 410 and the components therein can be part of the vehicle 100 and at least partially implemented using circuitry (e.g., the ECU 105 as discussed above or elsewhere) in the vehicle 100. The BoP unit 410 can be coupled with the fourth controller 225 to interface and communicate with the fourth controller 225. In interfacing, the fuel cell stack unit 405 can convey, relay, or otherwise send sensor data and feedback data to the fourth controller 225. Using the data, the fourth controller 225 can calculate, determine, or otherwise generate control signals to be applied or provided. The fuel cell stack unit 405 can also retrieve, identify, or otherwise receive control signals from the fourth controller 225, or other controllers. Via the BoP unit 410, the fourth controller 225 can control or regulate at least one of the fuel cell thermal manager 415 or the electrical control 420.

The fuel cell thermal manager 415 can administer, regulate, or otherwise control temperature of at least one respective fuel cell stack (e.g., an instance of the fuel cell stack 115). The fuel cell thermal manager 415 can be coupled with one or more components to perform or carry out regulation of the temperature. The components coupled with the fuel cell thermal manager 415 can include, for example: a pump for coolant flow; a valve (e.g., three-way valve) to direct coolant flow; a deionization (DI) polisher to remove ions from the coolant provided to the fuel cell stack; an electric heater to apply heat to the fuel cell stack; a ventilation fan to cool the fuel cell stack via air circulation; and a strainer to remove contaminants and other particles from the coolant, among others. In some embodiments, the fuel cell thermal manager 415 can be an instance of the thermal system 145, a part of the thermal system 145, or The fuel cell thermal manager 415 can be coupled with the fourth controller 225 to interface and communicate with the fourth controller 225. The fuel cell thermal manager 415 can relay, convey, or otherwise provide sensor data or feedback data to the fourth controller 225. The data can include, for example: a temperature of fuel cell stack; coolant flow rate; coolant temperature; density of contaminants the coolant; temperature of heater; a status of the fuel cell stack; and a status of each component, among others. The fuel cell thermal manager 415 can retrieve, identify, or otherwise receive control signals from the fourth controller 225. The control signals can include, for example: a command to direct coolant flow; a command to set or adjust (e.g., increase or decrease) coolant flow rate; and a command to enable or disable a respective component; among others. The control signals may have been generated by the fourth controller 225 using the data relayed by the fuel cell thermal manager 415. For example, the fourth controller 225 can determine to increase rate of coolant flow when the temperature of the fuel cell stack exceeds a threshold level. The fuel cell thermal manager 415 can pass, forward, or otherwise provide the control signals from the fourth controller 225 to the components.

The electrical control 420 can administer, handle, or otherwise control conveyance of electrical power between at least one respective fuel cell stack (e.g., an instance of the fuel cell stack 115) and various components in the vehicle 100 (e.g., the vehicle powertrain 305). The fuel cell stack controlled by the electrical control 420 can be the same as fuel cell stack managed by the fuel cell thermal manager 415. The fuel cell stack can be coupled with one or more components to perform or carry out the controlling of the conveyance of the electrical power. The components coupled with the electrical control 420 can include, for example: an engine control unit; a DC/DC converter; high voltage (HV) or low voltage (LV) bus connectors; one or more sensors (e.g., pressure gauge, thermometer, ampere meter, voltage meter, or power meter); and fuel cell junction box, among others. The engine control unit can handle, manage, or control various components of the vehicle powertrain 305, such as the power converter 125, the electric traction motor 130, the transmission 135, and the wheels 140 among others. The engine control unit can include one or more sensors to measure pedal position, vehicle speed, wheel speed, motor torque, and rotation speed of driveshaft, among others.

The electrical control 420 can be coupled with the fourth controller 225 to interface and communicate with the fourth controller 225. The electrical control 420 can relay, convey, or otherwise provide sensor data or feedback data to the fourth controller 225. The data can include, for example: output power, voltage, or current from the fuel cell stack or the battery pack; converted power, voltage, or current at the converter; pressure in fuel cell stack; temperature of fuel cell stack; vehicle speed, acceleration, torque; pedal position; motor torque; and rotation speed, among others. The electrical control 420 can retrieve, identify, or otherwise receive control signals from the fourth controller 225. The control signals can include, for example: a command to set or adjust output power, voltage, or current from the fuel cell stack; a command to set or adjust converted power, voltage, or current; a command to distribute torque among the wheel, among others. The control signals may have been generated by the fourth controller 225 using the data relayed by the electrical control 420. For example, the fourth controller 225 can detect a pedal position indicating a request for higher acceleration and generate a command signal to increase output power to effectuate the higher acceleration. The electrical control 420 can pass, forward, or otherwise provide the control signals from the fourth controller 225 to the components.

In some embodiments, the first controller (e.g., the first controller 220 of FIG. 2) can manage the respective fuel cell stack including the BoP mechanism 410 configured to manage heat, ventilation, or power distribution. The BoP mechanism 410 can include a thermal management system (e.g., the fuel cell thermal manager 415) and/or an electrical module (e.g., the electrical control 420).

Figure 5:
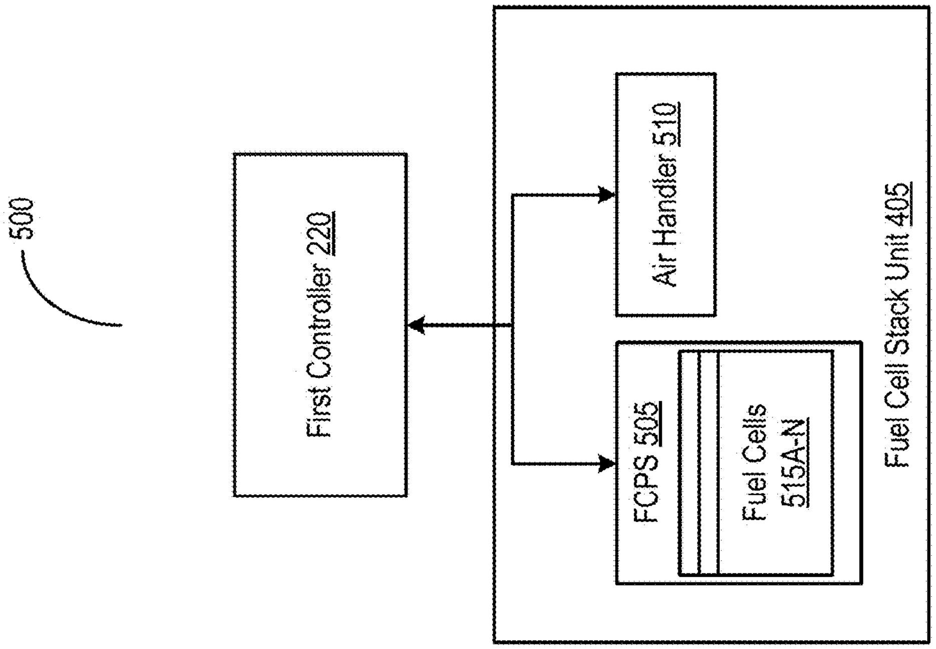
FIG. 5 depicts a block diagram of an architecture for a first controller in a vehicle, in accordance with an illustrative embodiment.

Referring now to FIG. 5, among others, depicted is a block diagram of an architecture 500 for the first controller 220 in the vehicle 100. In brief overview, the architecture 500 (sometimes referred herein as a module level architecture) can include the first controller 220 and the fuel cell stack unit 405. The architecture 500 can be arranged in at least one of the hierarchical layers 210 of the control topology 205 for the vehicle 100. The fuel cell stack unit 405 can include at least one fuel cell power stack (FCPS) 505, at least one air handler 510, and a set of fuel cells 515A-N (hereinafter generally referred to as fuel cells 515). The fuel cell stack unit 405 can be at least partially implemented using circuitry (e.g., the ECU 105 as discussed above or elsewhere) in the vehicle 100.

In the fuel cell stack unit 405, the FCPS 505 (sometimes herein referred to as a fuel cell power module (FCPM)) can correspond to or include one or more components to administer, manage, or otherwise control one or more respective fuel cells 515 in the vehicle 100. The FCPS 505 can correspond to a self-contained unit including various components to produce, regulate, and control conveyance of electrical power generated using the hydrogen fuel. The FCPS 505 can include the set of fuel cells 515 corresponding to a respective fuel cell stack (e.g., an instance of the fuel cell stack 115) or individual fuel cells in the fuel cell stack. Each fuel cell 515 can transform or convert the hydrogen fuel from the fuel storage (e.g., the fuel tank 110 or fuel storage 320) to produce electrical power, in the manner as previously described with respect to the fuel cell stack 115.

The FCPS 505 can include one or more components to manage, regulate, or otherwise control generation and conveyance of electrical power from the fuel cells 515. The components can include, for example: a manifold to supply hydrogen fuel from the fuel storage to the fuel cells 515; a pump to pull the hydrogen fuel from the fuel storage; and a regulator to control flow rate of the hydrogen fuel; among others. The FCPS 505 can be coupled with the first controller 220 to interface and communicate with the first controller 220. In interfacing, the FCPS 505 can convey, relay, or otherwise send sensor data and feedback data to the first controller 220. The data can include, for example: flow rate of the hydrogen fuel, a temperature of the hydrogen fuel, a temperature of the fuel cells 515, a temperature of the manifold, a pump rate, among others. Using the data, the first controller 220 can calculate, determine, or otherwise generate control signals to be applied or provided. For example, upon detecting a drop in a flow rate of the hydrogen below a tolerance range, the first controller 220 can generate a control signal to the pump to pull the hydrogen fuel at a higher rate from the fuel storage. The FCPS 505 can also retrieve, identify, or otherwise receive control signals from the first controller 220, or other controllers.

The air handler 510 can one or more components to manage, regulate, or otherwise control flow of air into the fuel cells 515 of the FCPS 505 in the fuel cell stack unit 405. The components can include, for example: air plumbing to facilitate conveyance of air (e.g., oxygen ($O_2$)) in the fuel cells 515 (e.g., in the cathode of each fuel cell 515); an air supplier to provide the air; an air compressor to control pressure of the air flowing into the fuel cells 515; a filter to remove or restrict particulates in the air; an air flow sensor to measure flow of air into or out of the fuel cells 515; and a value to enable, disable, or regulate flow of air into the fuel cells 515; among others. The air handler 510 can be coupled with the first controller 220 to interface and communicate with the first controller 220. In interfacing, the air handler 510 can convey, relay, or otherwise send sensor data and feedback data to the first controller 220. The data can include, for example: a rate of air flow into the individual fuel cells 515; a rate of air flow out of the individual fuel cells 515; a pressure measurement of the air; a density of particulates; an amount of air; among others. Using the data, the first controller 220 can calculate, determine, or otherwise generate control signals to be applied or provided. For example, upon measuring air pressure lower than a tolerance range for entering into the cathodes of the fuel cells 515, the first controller 220 can output a control signal for the compressor to increase compression of the air flowing into the fuel cells 551. The air handler 510 can also retrieve, identify, or otherwise receive control signals from the first controller 220, or other controllers.

Figure 6:
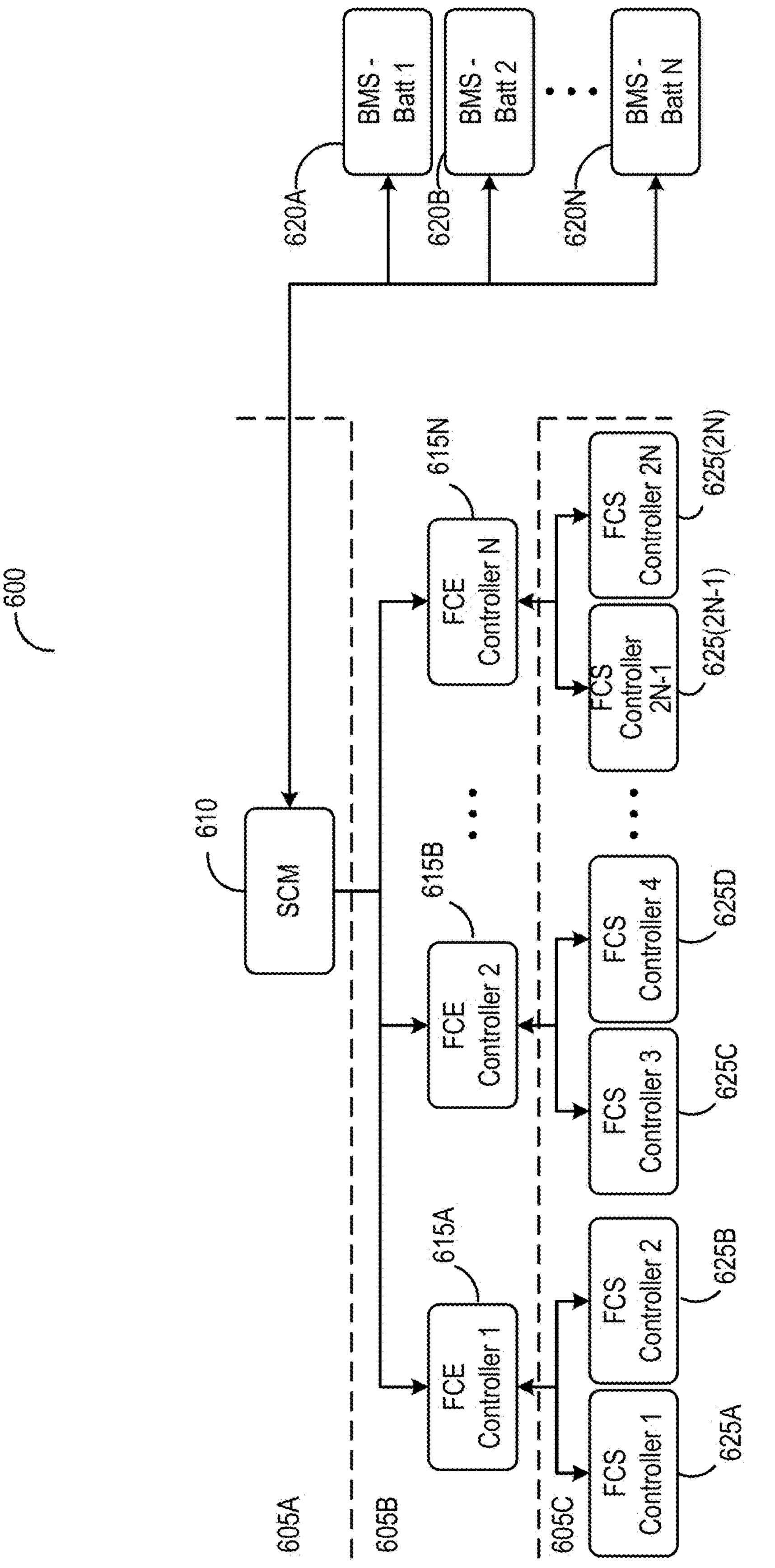
FIG. 6 depicts a block diagram of an arrangement for a control topology with separate controllers for module level, engine level, and system levels, in accordance with an illustrative embodiment.

Referring now to FIG. 6, among others, depicted is a block diagram of an arrangement 600 for the control topology 205 with separate controllers for module level, engine level, and system levels. The arrangement 600 of the control topology 205 can include controllers, such as at least one supervisory controller (SCM) 610, a set of fuel cell engine (FCE) controllers 615A-N (hereinafter generally referred to as FCE controllers 615), a set of battery management systems (BMS) 620A-N (hereinafter generally referred to as BMS 620), and a set of fuel cell stack (FCS) controllers 625A to 2N (hereinafter generally referred to as FCS controllers 625), among others. The controllers can be arranged across at least one system layer 605A, at least one engine layer 605B, and at least one module layer 605C of the control topology 205, among others. The arrangement 600 for the control topology 205 can be implemented with circuitry implemented using circuitry (e.g., the ECU 105 as discussed above or elsewhere) in the vehicle 100.

In the arrangement 600, the SCM 610 can be arranged in the system layer 605A of the control topology 205. The SCM 610 can be an instance of the third controller 215 as discussed above. The SCM 610 can be coupled with other controllers, such as the set of FCE controllers 615, the set of BMSs 620, and the set of FCS controllers 625, among others. The SCM 610 can be directly coupled with the set of FCE controllers 615 and the set of BMSs 620 arranged on the engine layer 605B. The SCM 610 can interface with one or more of the set of FCE controllers 615 and the set of BMSs 620. In addition, the SCM 610 can be indirectly coupled with the set of FCS controllers 625 via the set of FCE controllers 615 arranged on the module layer 605C. The SCM 610 can interface with one or more of the set of FCS controllers 625 via one or more of the FCE controllers 615. The SCM 610 can also interface with a vehicle powertrain (e.g., the vehicle powertrain 305) to control propulsion of the vehicle.

The set of FCE controllers 615 can be arranged in the engine layer 605B of the control topology 205 in the arrangement 600. Each FCE controller 615 can be an instance of the fourth controller 225 described above. The set of FCE controllers 615 can be coupled with the SCM 610 in the system layer 605A. The set of FCE controllers 615 can also be coupled with a respective subset of FCS controllers 625 in the module layer 605C. Each FCE controller 615 can manage, control, or otherwise regulate at least one of an electrical control (e.g., a respective instance of the electrical control 420) and a thermal manager (e.g., a respective instance of the fuel cell thermal manager 415) for at least one respective fuel cell stack (e.g., a respective instance of the fuel cell stack 115). Each FCE controller 615 can control the respective subset of FCS controllers 625. In the depicted example, the arrangement 600 can include twice as many FCS controllers 625 as FCE controllers 615 and each FCE controller 615 can control at least two FCS controllers 625 (e.g., FCE controllers 625(2N−1) and 625(2N) in the module layer 605C.

The set of BMSs 620 can be arranged in the engine layer 605B of the control topology 205 in the arrangement 600. In some embodiments, the set of BMSs 620 can be outside of the layers 605A-C of the control topology 205. Each BMS 620 can be an instance of the second controller 230 described above. The set of BMSs 620 can be coupled with the SCM 610 in the system layer 605A in the control topology 205. Each BMS 620 can administer, control, or otherwise manage a respective battery pack of a set of battery packs (e.g., a respective instance of the battery pack 120). In some embodiments, the functionalities of the set of BMSs 620 can be incorporated or embedded into the SCM 610 of the system layer 605A.

The set of FCS controllers 625 can be arranged in the module layer 605C of the control topology 205 in the arrangement 600. Each FCS controller 625 can be an instance of the first controller 220 as described above. Each of FCS controllers 625 can be directly coupled with at least one of the FCE controllers 615 in the engine layer 605B. The set of FCS controllers 625 can also be indirectly coupled with the SCM 610 in the system layer 605A via at least one of the FCE controllers 615. Each FCS controller 625 can administer, handle, or otherwise control a respective fuel cell stack of a set of fuel cell stacks (e.g., instances of the fuel cell stack 115). Each fuel cell stack can provide electrical energy to components in the vehicle 100.

Figure 7:
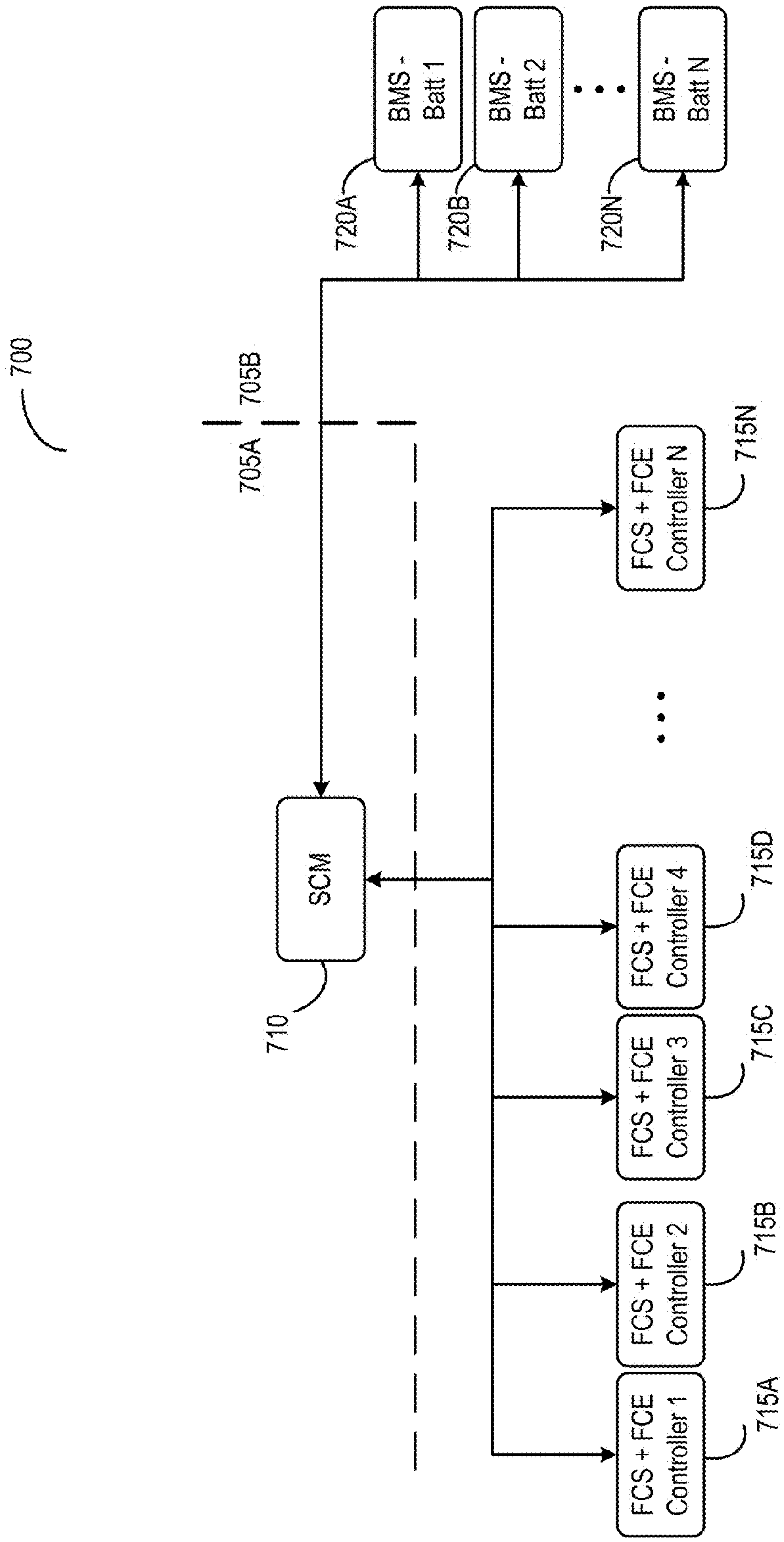
FIG. 7 depicts a block diagram of an arrangement for a control topology with a single controller for module level and engine level and separate controller for system level, in accordance with an illustrative embodiment.

Referring now to FIG. 7, among others, depicted is a block diagram of an arrangement 700 for the control topology 205 with a single controller for module level and engine level and separate controller for a system level. The arrangement 700 of the control topology 205 can include controllers, such as at least one supervisory controller (SCM) 710, a set of fuel cell stack and fuel cell engine integrated (FCS-FCE) controllers 715A-N (hereinafter generally referred to as FCS-FCE controller 715), and a set of battery management systems (BMSs) 720A-N (hereinafter generally referred to as BMSs 720), among others. The controllers can be arranged across at least one system layer 705A and at least one module-engine integrated layer 705B, among others in the arrangement 700 for the control topology 205. The arrangement 700 for the control topology 205 can be implemented with circuitry implemented using circuitry (e.g., the ECU 105 as discussed above or elsewhere) in the vehicle 100.

In the arrangement 700, the SCM 710 can be arranged in the system layer 705A of the control topology 205. The SCM 710 can be an instance of the third controller 215 as discussed above. The SCM 710 can be coupled with other controllers, such as the set of FCS-FCE controllers 715 and the set of BMSs 720, among others. The SCM 710 can be directly coupled with the set of FCS-FCE controllers 715 and the set of BMSs 720 arranged on the engine-module layer 705B. The SCM 710 can interface with one or more of the set of FCS-FCE controllers 715 and the set of BMSs 720. The SCM 710 can interface with one or more of the set of FCS controllers 725 via one or more of the FCS-FCE controllers 715. The SCM 710 can also interface with a vehicle powertrain (e.g., the vehicle powertrain 305) to control propulsion of the vehicle.

The set of FCS-FCE controllers 715 can be arranged in the engine-module layer 705B of the control topology 205 in the arrangement 700. Each FCS-FCE controller 715 can be an integrated instance of the first controller 220 and fourth controller 225 described above. The set of FCS-FCE controllers 715 can be coupled with the SCM 710 in the system layer 705A. Each FCS-FCE controller 715 can manage, control, or otherwise regulate at least one of an electrical control (e.g., a respective instance of the electrical control 420) and a thermal manager (e.g., a respective instance of the fuel cell thermal manager 415) for at least one respective fuel cell stack (e.g., a respective instance of the fuel cell stack 115). Each FCS-FCE controller 715 can also administer, handle, or otherwise control a respective fuel cell stack of a set of fuel cell stacks (e.g., instances of the fuel cell stack 115). Each fuel cell stack can provide electrical energy to components in the vehicle 100.

The set of BMSs 720 can be arranged in the engine-module layer 705B of the control topology 205 in the arrangement 700. In some embodiments, the set of BMSs 720 can be outside of the layers 705A-C of the control topology 205. Each BMS 720 can be an instance of the second controller 230 described above. The set of BMSs 720 can be coupled with the SCM 710 in the system layer 705A in the control topology 205. Each BMS 720 can administer, control, or otherwise manage a respective battery pack of a set of battery packs (e.g., a respective instance of the battery pack 120). In some embodiments, the functionalities of the set of BMSs 720 can be incorporated or embedded into the SCM 710 of the system layer 705A.

Figure 8:
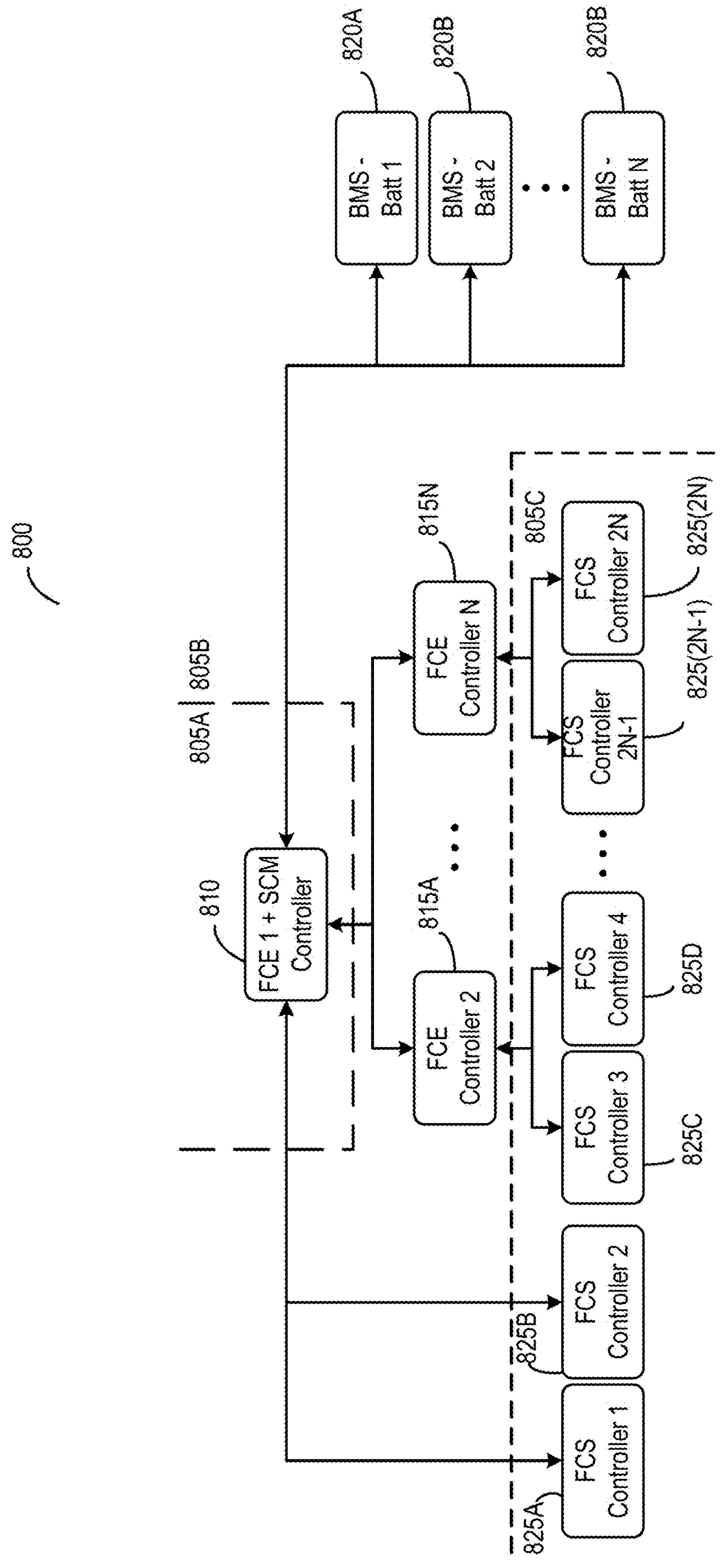
FIG. 8 depicts a block diagram of an arrangement for a control topology with a separate controller for module level and engine level and system controller for system level, in accordance with an illustrative embodiment.

Referring now to FIG. 8, among others, depicted is a block diagram of an arrangement 800 for the control topology 205 with a separate controller for module level and engine level and system controller for system level. The arrangement 800 of the control topology 205 can include controllers, such as at least integrated one supervisory controller and fuel cell engine controller (FCE-SCM) 810, a set of fuel cell engine (FCE) controllers 815A-N (hereinafter generally referred to as FCE controllers 815), a set of battery managers (BMS) 820A-N (hereinafter generally referred to as BMS 820), and a set of fuel cell stack (FCS) controllers

825A to 2N (hereinafter generally referred to as FCS controllers 825), among others. The controllers can be arranged across at least one system layer 805A, at least one engine layer 805B, and at least one module layer 805C of the control topology 205, among others. The arrangement 800 for the control topology 205 can be implemented with circuitry implemented using circuitry (e.g., the ECU 105 as discussed above or elsewhere) in the vehicle 100.

In the arrangement 800, the FCE-SCM 810 can be arranged in the system layer 805A of the control topology 205. The FCE-SCM 810 can be an integration of an instance of the third controller 215 with the fourth controller 225 as discussed above. The FCE-SCM 810 can be coupled with other controllers, such as the set of FCE controllers 815, the set of BMSs 820, and the set of FCS controllers 825, among others. The FCE-SCM 810 can be directly coupled with the set of FCE controllers 815 and the set of BMSs 820 arranged on the engine layer 805B and with a subset of FCS controllers 825 (e.g., the FCS controllers 825A and 825B) arranged on the module layer 805C. The FCE-SCM 810 can interface with one or more of the set of FCE controllers 815, the set of BMSs 820, and the subset of FCS controllers 825. The FCE-SCM 810 can provide system or supervisory control of the subset of FCS controllers 825. In addition, the FCE-SCM 810 can be indirectly coupled with a remaining subset of FCS controllers 825 via the set of FCE controllers 815 arranged on the module layer 805C. The FCE-SCM 810 can interface with one or more of the set of FCS controllers 825 via one or more of the FCE controllers 815. The FCE-SCM controller 810 can manage, control, or otherwise regulate at least one of an electrical control (e.g., a respective instance of the electrical control 420) and a thermal manager (e.g., a respective instance of the fuel cell thermal manager 415) for at least one respective fuel cell stack (e.g., a respective instance of the fuel cell stack 115). The FCE-SCM 810 can also interface with a vehicle powertrain (e.g., the vehicle powertrain 305) to control propulsion of the vehicle.

The set of FCE controllers 815 can be arranged in the engine layer 805B of the control topology 205 in the arrangement 800. Each FCE controller 815 can be an instance of the fourth controller 225 described above. The set of FCE controllers 815 can be coupled with the FCE-SCM 810 in the system layer 805A. The set of FCE controllers 815 can also be coupled with a respective subset of FCS controllers 825 in the module layer 805C. Each FCE controller 815 can manage, control, or otherwise regulate at least one of an electrical control (e.g., a respective instance of the electrical control 420) and a thermal manager (e.g., a respective instance of the fuel cell thermal manager 415) for at least one respective fuel cell stack (e.g., a respective instance of the fuel cell stack 115). Each FCE controller 815 can control the respective subset of FCS controllers 825. In the depicted example, the arrangement 800 can include at least twice as many FCS controllers 825 as FCE controllers 815 and each FCE controller 815 can control at least two FCS controllers 825 (e.g., FCS controllers 825(2N−1) and 825(2N) in the module layer 805C.

The set of BMSs 820 can be arranged in the engine layer 805B of the control topology 205 in the arrangement 800. In some embodiments, the set of BMSs 820 can be outside of the layers 805A-C of the control topology 205. Each BMS 820 can be an instance of the second controller 230 described above. The set of BMSs 820 can be coupled with the FCE-SCM 810 in the system layer 805A in the control topology 205. Each BMS 820 can administer, control, or otherwise manage a respective battery pack of a set of battery packs (e.g., a respective instance of the battery pack 120). In some embodiments, the functionalities of the set of BMSs 820 can be incorporated or embedded into the FCE-SCM 810 of the system layer 805A.

The set of FCS controllers 825 can be arranged in the module layer 805C of the control topology 205 in the arrangement 800. Each FCS controller 825 can be an instance of the first controller 220 as described above. A subset of FCS controllers 825 (e.g., FCS controllers 825A and 825B) can be directly coupled with the FCE-SCM controller 810 in the system layer 805A. Each of a remaining subset FCS controllers 825 can be directly coupled with at least one of the FCE controllers 815 in the engine layer 805B. The set of FCS controllers 825 can also be indirectly coupled with the FCE-SCM 810 in the system layer 805A via at least one of the FCE controllers 815. Each FCS controller 825 can administer, handle, or otherwise control a respective fuel cell stack of a set of fuel cell stacks (e.g., instances of the fuel cell stack 115). Each fuel cell stack can provide electrical energy to components in the vehicle 100.

Figure 9:
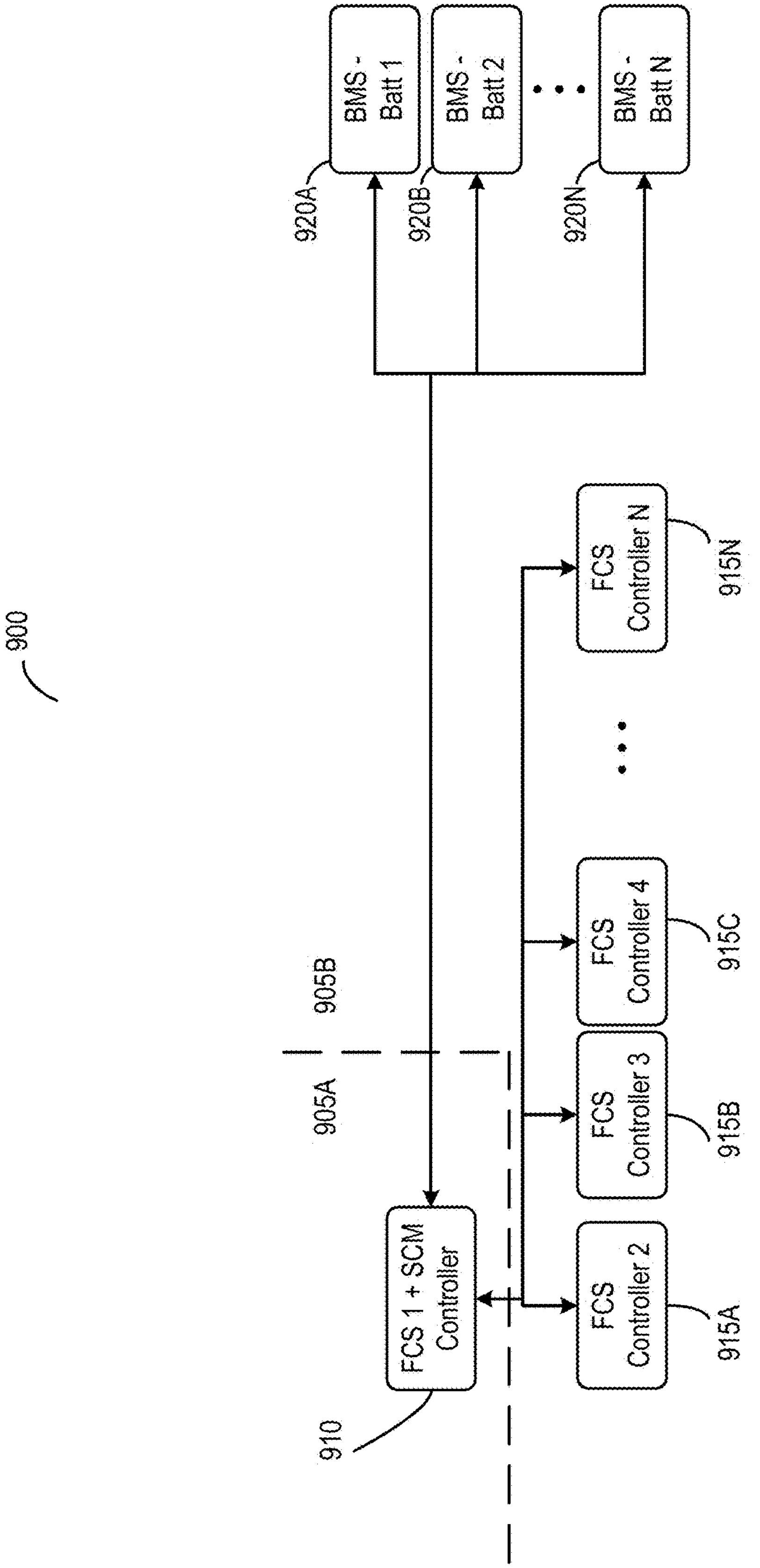
FIG. 9 depicts a block diagram of an arrangement for a control topology with a single controller for module level and system level functionality embedded in a module controller, in accordance with an illustrative embodiment.

Referring now to FIG. 9, among others, depicted is a block diagram of an arrangement 900 for the control topology 205 with a single controller for module level and system level functionality embedded in a module controller. The arrangement 900 of the control topology 205 can include controllers, such as at least one integrated supervisory controller and fuel cell stack controller (FCS-SCM) 910, a set of fuel cell stack (FCS) controllers 915A-N (hereinafter generally referred to as FCS controllers 915), a set of battery manager systems (BMSs) 920A-N (hereinafter generally referred to as BMS 920), among others. The controllers can be arranged across at least one system layer 905A and at least one module layer 905B of the control topology 205, among others. The arrangement 900 for the control topology 205 can be implemented with circuitry implemented using circuitry (e.g., the ECU 105 as discussed above or elsewhere) in the vehicle 100.

In the arrangement 900, the FCS-SCM 910 can be arranged in the system layer 905A of the control topology 205. The FCS-SCM 910 can be an instance of the third controller 215 integrated with an instance of the first controller 220 as discussed above. The FCS-SCM 910 can be coupled with other controllers, such as the set of FCS controllers 915 and the set of BMSs 920 among others. The FCS-SCM 910 can be directly coupled with the set of FCS controllers 915 and the set of BMSs 920 arranged on the module layer 905B. The FCS-SCM 910 can interface with one or more of the set of FCS controllers 915 and the set of BMSs 920. The FCS-SCM 910 can also interface with a vehicle powertrain (e.g., the vehicle powertrain 305) to control propulsion of the vehicle. The FCS-SCM 910 can provide system level supervisory control of functions related to the first controller 220 and the fourth controller 225 as discussed above. The FCS-SCM 910 can also manage, control, or otherwise regulate at least one of an electrical control (e.g., a respective instance of the electrical control 420) and a thermal manager (e.g., a respective instance of the fuel cell thermal manager 415) for at least one respective fuel cell stack (e.g., a respective instance of the fuel cell stack 115). The FCS-SCM 910 can administer, handle, or otherwise control a respective fuel cell stack of a set of fuel cell stacks (e.g., instances of the fuel cell stack 115). Each fuel cell stack can provide electrical energy to components in the vehicle 100.

The set of BMSs 920 can be arranged in the module layer 905B of the control topology 205 in the arrangement 900. In some embodiments, the set of BMSs 920 can be outside of the layers 905A-C of the control topology 205. Each BMS 920 can be an instance of the second controller 230 described above. The set of BMSs 920 can be coupled with the FCS-SCM 910 in the system layer 905A in the control topology 205. Each BMS 920 can administer, control, or otherwise manage a respective battery pack of a set of battery packs (e.g., a respective instance of the battery pack 120). In some embodiments, the functionalities of the set of BMSs 920 can be incorporated or embedded into the FCS-SCM 910 of the system layer 905A.

The set of FCS controllers 915 can be arranged in the module layer 905C of the control topology 205 in the arrangement 900. Each FCS controller 915 can be an instance of the first controller 220 as described above. Each of FCS controllers 915 can be directly coupled with the FCS-SCM controller 910 in the system layer 905 of the control topology 205. Each FCS controller 915 can administer, handle, or otherwise control a respective fuel cell stack of a set of fuel cell stacks (e.g., instances of the fuel cell stack 115). Each fuel cell stack can provide electrical energy to components in the vehicle 100.

Figure 10:
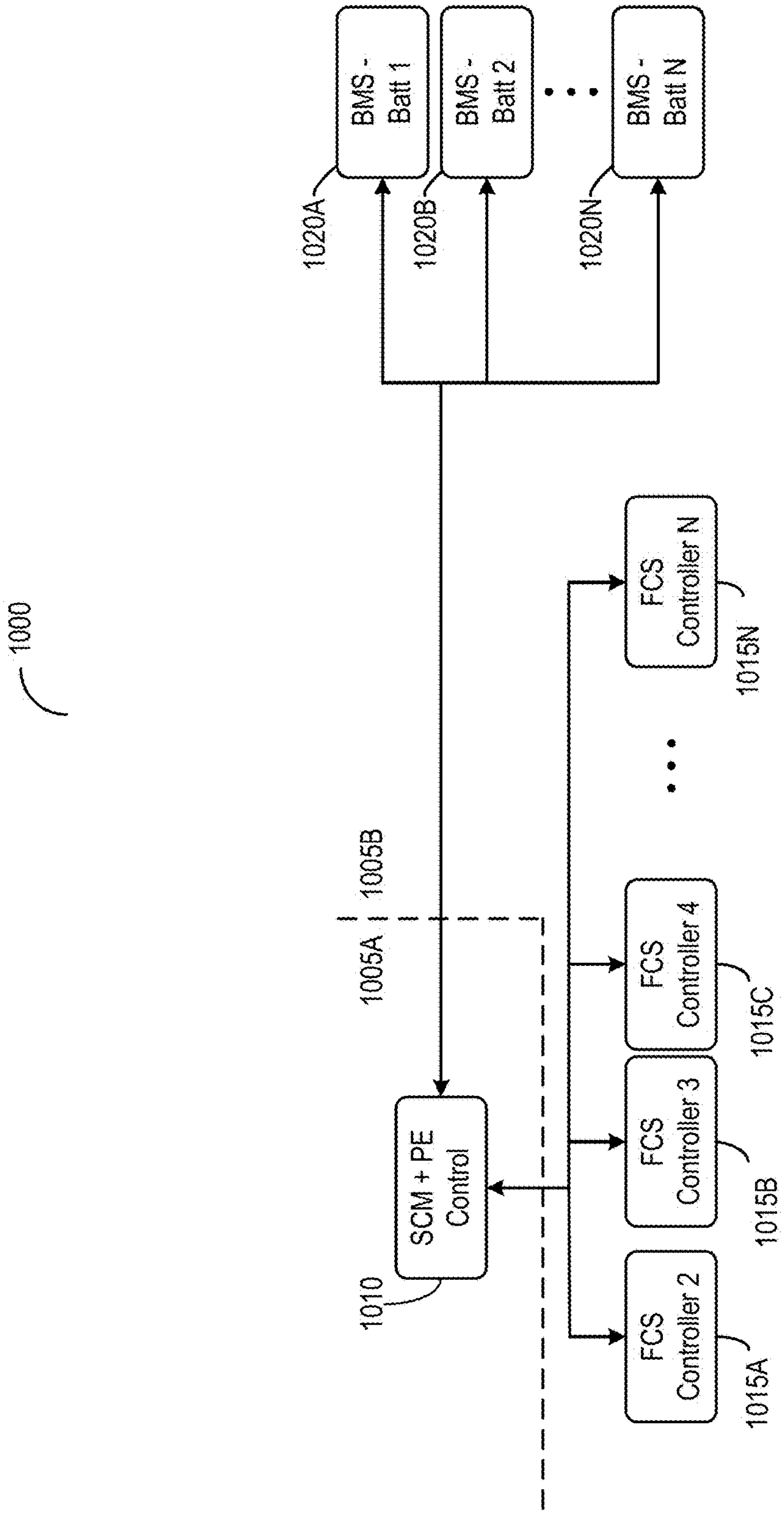
FIG. 10 depicts a block diagram of an arrangement for a control topology with a single controller for module level and system level functionality embedded in a module controller with power electronics control, in accordance with an illustrative embodiment.

Referring now to FIG. 10, among others, depicted is a block diagram of an arrangement 1000 for the control topology 205 with a single controller for module level and system level functionality embedded in a module controller with power electronics control. The arrangement 1000 of the control topology 205 can include controllers, such as at least one integrated supervisory controller and power electronics controller (PE-SCM) 1010, a set of fuel cell stack (FCS) controllers 1015A-N (hereinafter generally referred to as FCS controllers 1015), a set of battery manager systems (BMSs) 1020A-N (hereinafter generally referred to as BMS 1020), among others. The controllers can be arranged across at least one system layer 1005A and at least one module layer 1005B of the control topology 205, among others. The arrangement 1000 for the control topology 205 can be implemented with circuitry implemented using circuitry (e.g., the ECU 105 as discussed above or elsewhere) in the vehicle 100.

In the arrangement 1000, the PE-SCM 1010 can be arranged in the system layer 1005A of the control topology 205. The PE-SCM 1010 can be an instance of the third controller 215 integrated with an instance of the power electronics 335 as discussed above. The PE-SCM 1010 can be coupled with other controllers, such as the set of FCS controllers 1015 and the set of BMSs 1020 among others. The PE-SCM 1010 can be directly coupled with the set of FCS controllers 1015 and the set of BMSs 1020 arranged on the module layer 1005B. The PE-SCM 1010 can interface with one or more of the set of FCS controllers 1015 and the set of BMSs 1020. The PE-SCM 1010 can also interface with a vehicle powertrain (e.g., the vehicle powertrain 305) to control propulsion of the vehicle.

The PE-SCM 1010 can also administer, configure, or otherwise manage a distribution of electrical power throughout the components in the vehicle 100. The FE-SCM 1010 can control operations of battery packs and an electronic motor for the propulsion of the vehicle. In some embodiments, the PE-SCM 1010 can also integrate functionalities of the first controller 220 or the fourth controller 225 as discussed above, or both. The PE-SCM 1010 can provide system level supervisory control of functions related to the first controller 220 and the fourth controller 225 as discussed above. The PE-SCM 1010 can also manage, control, or otherwise regulate at least one of an electrical control (e.g., a respective instance of the electrical control 420) and a thermal manager (e.g., a respective instance of the fuel cell thermal manager 415) for at least one respective fuel cell stack (e.g., a respective instance of the fuel cell stack 115). The PE-SCM 1010 can administer, handle, or otherwise control a respective fuel cell stack of a set of fuel cell stacks (e.g., instances of the fuel cell stack 115). Each fuel cell stack can provide electrical energy to components in the vehicle 100.

The set of FCS controllers 1015 can be arranged in the module layer 1005C of the control topology 205 in the arrangement 1000. Each FCS controller 1015 can be an instance of the first controller 220 as described above. Each of FCS controllers 1015 can be directly coupled with the PE-SCM controller 1010 in the system layer 1005 of the control topology 205. Each FCS controller 1015 can administer, handle, or otherwise control a respective fuel cell stack of a set of fuel cell stacks (e.g., instances of the fuel cell stack 115). Each fuel cell stack can provide electrical energy to components in the vehicle 100. In some embodiments, each FCS controller 1010 can be integrated with the functionalities of the fourth controller 225 described above.

The set of BMSs 1020 can be arranged in the module layer 1005B of the control topology 205 in the arrangement 1000. In some embodiments, the set of BMSs 1020 can be outside of the layers 1005A-C of the control topology 205. Each BMS 1020 can be an instance of the second controller 230 described above. The set of BMSs 1020 can be coupled with the PE-SCM 1010 in the system layer 1005A in the control topology 205. Each BMS 1020 can administer, control, or otherwise manage a respective battery pack of a set of battery packs (e.g., a respective instance of the battery pack 120). In some embodiments, the functionalities of the set of BMSs 1020 can be incorporated or embedded into the PE-SCM 1010 of the system layer 1005A.

Figure 11:
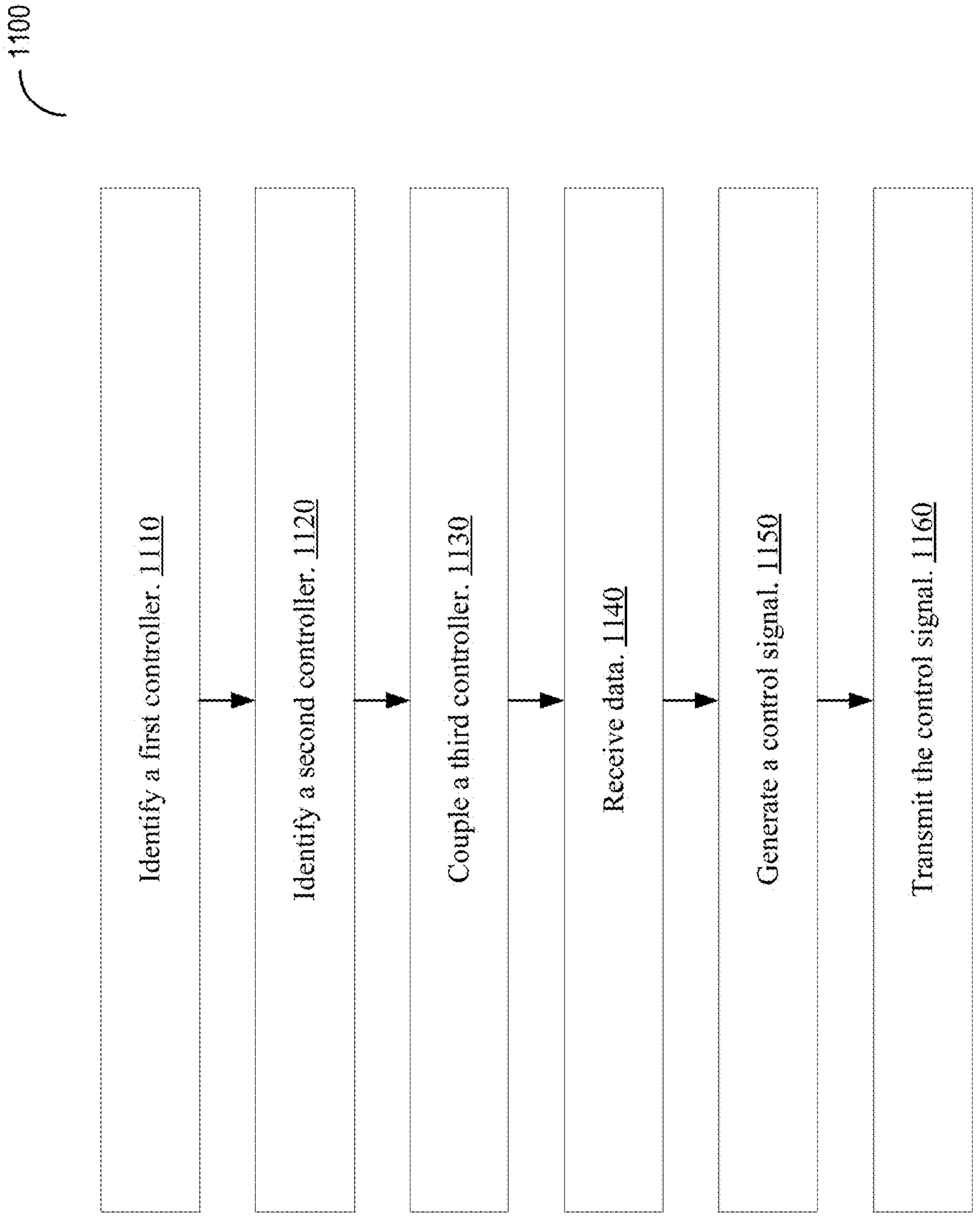
FIG. 11 depicts a flow chart of an example method for vehicle power control in accordance with an illustrative embodiment.

FIG. 11 depicts a flow chart of an example method 1100 for vehicle power control in accordance with an illustrative embodiment. It is noted that the method 1100 is merely an example and is not intended to limit the present disclosure. Accordingly, it is understood that additional operations may be provided before, during, and after the method 1100 of FIG. 11, and that some other operations may only be briefly described herein.

In a brief overview, the method 1100 begins with operation 1110 of identifying a first controller. For example, at operation 1110, the method 1100 may include identifying a plurality of first controllers in a first hierarchical layer of a control topology to control a first source of energy based on first data. The method 1100 continues to operation 1120 of identifying a second controller. For example, at operation 1120, the method 1100 may include identifying a plurality of second controllers in the first hierarchical layer to control a second source of energy based on second data. The method 1100 continues to operation 1130 of coupling a third controller. For example, at operation 1130, the method 1100 may include coupling a third controller with the plurality of first controllers and the plurality of second controllers. The method 1100 continues to operation 1140 of receiving data. For example, at operation 1140, the method 1100 may include receiving, by the third controller, the first data and the second data. The method 1100 continues to operation 1150 of generating a control signal. For example, at operation 1150, the method 1100 may include generating, by the third controller, a control signal based on the first data and the second data. The method 1100 continues to operation 1160 of transmitting the control signal. For example, at operation 1160, the method 1100 may include transmitting the control signal to a component to control the component.

At operation 1110, a plurality of first controllers (e.g., the first controllers 220) can be arranged and/or identified in a first hierarchical layer (e.g., the hierarchical layer 210B) of a control topology (e.g., the control topology 205) to control a first source of energy based on first data. Each of the plurality of first controllers can control the first source of energy of a vehicle (e.g., the vehicle 100) based on the first data of the first source of energy. For example, an ECU (e.g., the ECU 105) can identify the plurality of first controllers in the first hierarchical layer. In some embodiments, the method 1100 can include providing, by the first controller, a first signal to the first source of energy based on the first data.

At operation 1120, a plurality of second controllers (e.g., the second controllers 230) can be arranged and/or identified in the first hierarchical layer to control a second source of energy based on second data. Each of the plurality of second controllers can control the second source of energy of the vehicle based on second data of the second source of energy. For example, an ECU (e.g., the ECU 105) can identify the plurality of second controllers in the first hierarchical layer. In some embodiments, the method 1100 can include providing, by the second controller, a second signal to the second source of energy based on the second data.

At operation 1130, a third controller (e.g., the third controller 215) can be coupled with the plurality of first controllers and the plurality of second controllers. In some embodiments, the third controller can be arranged and/or identified in a second hierarchical layer (e.g., the hierarchical layer 210A). For example, an ECU (e.g., the ECU 105) can identify the third controller in the second hierarchical layer. The ECU can couple the third controller with the plurality of first controllers and the plurality of second controllers.

At operation 1140, the method 1100 can include receiving, by the third controller, the first data and the second data. In some embodiments, the first data can include fuel cell stack data. In some embodiments, the second data can include battery data.

At operation 1150, the method 1100 can include generating, by the third controller, a control signal based on the first data and the second data. At operation 1160, the method 1100 can include transmitting the control signal to a component to control the component. In some embodiments, the method 1100 can include controlling, by the third controller, via the control signal, (i) a sub-component of a powertrain of the vehicle, (ii) a propulsion or navigation component of the vehicle, or (iii) a power electronics, a converter, or a high-voltage component of the vehicle. In some embodiments, the method 1100 can include controlling, by the third controller, via at least one of the plurality of first controllers, an electrical control and a thermal manager for at least one corresponding fuel cell stack.

While this specification contains various implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, means the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components, being attached to one another.

The terms "fluidly coupled to" and the like, as used herein, mean the two components or objects have a pathway formed between the two components or objects in which a fluid, such as air, reductant, an air-reductant mixture, exhaust gas, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values herein are inclusive of their maximum values and minimum values unless otherwise indicated. Furthermore, a range of values does not necessarily require the inclusion of intermediate values within the range of values unless otherwise indicated.

It is important to note that the construction and arrangement of the various systems and the operations according to various techniques shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow.

What is claimed is:

1. A system for hierarchical power control, comprising:
a first controller arranged in a first hierarchical layer of a control topology, the first controller configured to control a first source of energy of a vehicle based on first data of the first source of energy, the first source of energy comprising a fuel cell stack;
a second controller arranged in the first hierarchical layer of the control topology, the second controller configured to control a second source of energy of the vehicle based on second data of the second source of energy, the second source of energy comprising a battery pack;
a third controller corresponding to a supervisory controller arranged in a second hierarchical layer of the control topology, the third controller configured to:
receive the first data and the second data from the first hierarchical layer;
generate a control signal based on the first data and the second data; and
transmit the control signal to a component of the vehicle to control the component of the vehicle; and
a fourth controller arranged in a third hierarchical layer of the control topology, the fourth controller configured to:
(i) regulate at least one of an electrical control and a thermal manager for the fuel cell stack; and
(ii) control the first controller arranged in the first hierarchical layer.

2. The system of claim 1, wherein the third controller is configured to indirectly interface with the first controller via the fourth controller.

3. The system of claim 1, wherein the component comprises a sub-component of a powertrain of the vehicle, and the third controller is further configured to generate the control signal to control the sub-component of the powertrain of the vehicle.

4. The system of claim 1, wherein the component comprises at least one of:
a propulsion component of the vehicle, a navigation component of the vehicle, a power electronics, a converter, or a high-voltage component of the vehicle; and
the third controller is further configured to generate the control signal to control at least one of propulsion of the vehicle, navigation of the vehicle, the power electronics, the converter, or the high-voltage component of the vehicle.

5. The system of claim 1, wherein the first controller is configured to provide a first signal directly to the first source of energy based on the first data, and the second controller is configured to provide a second signal directly to the second source of energy based on the second data.

6. The system of claim 1, wherein:
the component comprises an internal electrical energy source of the vehicle; and
the third controller is further configured to generate the control signal to control the internal electrical energy source of the vehicle.

7. A system for hierarchical power control, comprising:
a plurality of first controllers arranged in a first hierarchical layer of a control topology, each of the plurality of first controllers configured to manage a respective fuel cell stack of a plurality of fuel cell stacks, each of the plurality of fuel cell stacks configured to provide electrical energy to a component in a vehicle;
a plurality of second controllers arranged in the first hierarchical layer, the plurality of second controllers coupled with a plurality of battery packs disposed in the vehicle, each of the plurality of second controllers configured to manage a respective battery pack of the plurality of battery packs;
a third controller corresponding to a supervisory controller coupled with the plurality of first controllers and the plurality of second controllers, the third controller arranged in a second hierarchical layer of the control topology, the third controller configured to interface with: (i) one or more of the plurality of first controllers and the plurality of second controllers and (ii) a vehicle powertrain configured to control propulsion of the vehicle; and
a plurality of fourth controllers arranged in a third hierarchical layer of the control topology, at least one fourth controller of the plurality of fourth controllers configured to: (i) regulate at least one of an electrical control and a thermal manager for at least one of the plurality of fuel cell stacks and (ii) control at least one first controller of the plurality of first controllers arranged in the first hierarchical layer.

8. The system of claim 7, wherein each of the plurality of first controllers is further configured to regulate the electrical control and the thermal manager for at least one of the plurality of fuel cell stacks.

9. The system of claim 7,
wherein the third controller is further configured to:
indirectly interface with the at least one first controller via the at least one fourth controller,
directly interface with at least one other first controller of the plurality of first controllers, and
regulate the electrical control and the thermal manager for at least one of the plurality of fuel cell stacks associated with the at least one other first controller.

10. The system of claim 7,
wherein each of the plurality of first controllers is further configured to regulate the electrical control and the thermal manager for at least one of the plurality of fuel cell stacks, and
wherein the third controller is further configured to: (i) manage the respective fuel cell stack of the plurality of fuel cell stacks and (ii) regulate, via interfacing with at least one of the plurality of first controllers, the electrical control and the thermal manager for at least one of the plurality of fuel cell stacks.

11. The system of claim 7, wherein in controlling the propulsion of the vehicle, at least one first controller of the plurality of first controllers is configured to control generation or conveyance of electrical power from one of the plurality of fuel cell stacks.

12. The system of claim 7,
wherein the second hierarchical layer is higher in the control topology than the first hierarchical layer, and
wherein at least one controller in the first hierarchical layer is configured to provide sensor data to the third controller, and the third controller is configured to generate a control signal based on the sensor data.

13. The system of claim 7,
wherein each of the plurality of first controllers is further configured to manage the respective fuel cell stack including a balance of plant (BoP) mechanism configured to manage heat, ventilation, or power distribution, and wherein the BoP mechanism includes a thermal management system or an electrical module.

14. The system of claim 7, wherein the second hierarchical layer is a system level layer configured to supervise the first hierarchical layer, and the first hierarchical layer is an engine level layer or a module level layer associated with operation of the vehicle.

15. The system of claim 7, wherein the third controller is a supervisory controller configured to control functions related to at least one first controller of the plurality of first controllers or at least one second controller of the plurality of second controllers.

16. A method for hierarchical power control, comprising:

identifying a plurality of first controllers in a first hierarchical layer of a control topology, each of the plurality of first controllers configured to control a first source of energy of a vehicle based on first data of the first source of energy, the first source of energy comprising a fuel cell stack;

identifying a plurality of second controllers in the first hierarchical layer of the control topology, each of the plurality of second controllers configured to control a second source of energy of the vehicle based on second data of the second source of energy, the second source of energy comprising a battery pack;

coupling a third controller, corresponding to a supervisory controller arranged in a second hierarchical layer of the control topology, with the plurality of first controllers and the plurality of second controllers;

coupling a fourth controller, arranged in a third hierarchical layer of the control topology, with the third controller and one or more of the plurality of first controllers;

receiving, by the third controller, the first data and the second data;

generating, by the third controller, a control signal based on the first data and the second data; and transmitting, by the third controller, the control signal to a component of the vehicle to control the component of the vehicle, wherein the fourth controller is to:

(i) regulate at least one of an electrical control and a thermal manager for the fuel cell stack; and (ii) control the one or more of the plurality of first controllers arranged in the first hierarchical layer.

17. The method of claim 16, further comprising:

controlling, by the third controller, via the control signal, (i) a sub-component of a powertrain of the vehicle, (ii) a propulsion or navigation component of the vehicle, or (iii) a power electronics, a converter, or a high-voltage component of the vehicle.

18. The method of claim 16, further comprising:

providing, by at least one first controller of the plurality of first controllers, a first signal to the first source of energy based on the first data; and providing, by at least one second controller of the plurality of first controllers, a second signal to the second source of energy based on the second data.

19. The method of claim 16, further comprising:

controlling, by the third controller, via at least one of the plurality of first controllers, an electrical control and a thermal manager for at least one corresponding fuel cell stack.

* * * * *